(12) United States Patent
Kiraly et al.

(10) Patent No.: US 6,249,606 B1
(45) Date of Patent: Jun. 19, 2001

(54) METHOD AND SYSTEM FOR GESTURE CATEGORY RECOGNITION AND TRAINING USING A FEATURE VECTOR

(75) Inventors: Jozsef Kiraly, San Martin, CA (US); Ervin Dobler, Hajos (HU)

(73) Assignee: Mindmaker, Inc., San Jose, CA (US)

( * ) Notice: Subject to any disclaimer, the term of this patent is extended or adjusted under 35 U.S.C. 154(b) by 0 days.

(21) Appl. No.: 09/026,881

(22) Filed: Feb. 19, 1998

(51) Int. Cl.[7] .................................................... G06K 9/46
(52) U.S. Cl. ...................... 382/195; 382/203; 382/153; 345/145; 345/156; 345/173
(58) Field of Search .................... 345/145, 358, 345/173, 156, 157, 158; 382/203, 202, 157, 195

(56) References Cited

U.S. PATENT DOCUMENTS

| | | | |
|---|---|---|---|
| 5,252,951 | 10/1993 | Tannenbaum et al. | 345/156 |
| 5,454,043 | 9/1995 | Freeman | 382/168 |
| 5,570,113 | 10/1996 | Zetts | 345/173 |
| 5,572,651 | 11/1996 | Weber et al. | 395/155 |
| 5,583,946 | 12/1996 | Gourdol | 382/187 |
| 5,590,219 | 12/1996 | Gourdol | 382/202 |
| 5,594,810 | 1/1997 | Gourdol | 382/187 |
| 5,600,765 | 2/1997 | Ando et al. | 395/133 |
| 5,680,481 | * 10/1997 | Parasad et al. | 382/202 |
| 5,745,599 | * 4/1998 | Uchiyama et al. | 382/202 |
| 5,764,797 | * 6/1998 | Adcock | 382/203 |
| 5,870,494 | * 2/1999 | Kanda et al. | 382/203 |
| 5,870,713 | * 2/1999 | Haneda et al. | 345/173 |
| 5,880,411 | * 3/1999 | Gillespie et al. | 345/157 |
| 5,881,171 | * 3/1999 | Kinjo | 382/203 |
| 5,887,078 | * 3/1999 | Kwon et al. | 382/156 |
| 5,887,081 | * 3/1999 | Bantum | 382/203 |

FOREIGN PATENT DOCUMENTS

0629988 A2    12/1994    (EP) .............................. G09B/21/00

OTHER PUBLICATIONS

McWhirter J.G. et al., "A Systolic Array For Nonlinear Adaptive Filtering and Pattern Recognition", Proceedings of the Int'l. Conference on Applications Specific Array Processor, Princeton, Sep. 5–7, 1990, No. Conf. 4, pp. 700–711.
Burges, C.J.C. "Simplified Support Vector Decision Rules", Machine Learning, Proceedings of the Int'l Conference, Jul. 3, 1996, pp. 71–77.

* cited by examiner

Primary Examiner—Jerome Grant, II
Assistant Examiner—Kevin C Kianni
(74) Attorney, Agent, or Firm—Wagner, Murabito & Hao LLP

(57) ABSTRACT

A computer implemented method and system for gesture category recognition and training. Generally, a gesture is a hand or body initiated movement of a cursor directing device to outline a particular pattern in particular directions done in particular periods of time. The present invention allows a computer system to accept input data, originating from a user, in the form gesture data that are made using the cursor directing device. In one embodiment, a mouse device is used, but the present invention is equally well suited for use with other cursor directing devices (e.g., a track ball, a finger pad, an electronic stylus, etc.). In one embodiment, gesture data is accepted by pressing a key on the keyboard and then moving the mouse (with mouse button pressed) to trace out the gesture. Mouse position information and time stamps are recorded. The present invention then determines a multi-dimensional feature vector based on the gesture data. The feature vector is then passed through a gesture category recognition engine that, in one implementation, uses a radial basis function neural network to associate the feature vector to a pre-existing gesture category. Once identified, a set of user commands that are associated with the gesture category are applied to the computer system. The user commands can originate from an automatic process that extracts commands that are associated with the menu items of a particular application program. The present invention also allows user training so that user-defined gestures, and the computer commands associated therewith, can be programmed into the computer system.

26 Claims, 17 Drawing Sheets

1200

```
         ENTER
           ↓
┌─────────────────────────────────────────┐
│ RECORD INDICATOR MOVEMENTS UNTIL TRIGGER OFF │─ 1210
│ TO OBTAIN NEW GESTURE DATA, STORE GESTURE   │
│         DATA IN MEMORY UNIT                 │
└─────────────────────────────────────────┘
           ↓
┌─────────────────────────────────────────┐
│ DETERMINE SMALL WINDOW, NORMALIZE AND       │─ 1220
│ COMPUTE FEATURE VECTOR ASSOCIATED WITH      │
│         NEW GESTURE CATEGORY                │
└─────────────────────────────────────────┘
           ↓
┌─────────────────────────────────────────┐
│ RECEIVE FROM USER A DEFINITION OF THE NEW   │─ 1230
│ GESTURE CATEGORY, INCLUDING A SET OF        │
│ COMPUTER COMMANDS ASSOCIATED WITH THE NEW   │
│ GESTURE CATEGORY, STORE IN MEMORY UNIT      │
└─────────────────────────────────────────┘
           ↓
┌─────────────────────────────────────────┐
│ USING THE COMPUTED FEATURE VECTOR, DEFINE   │─ 1240
│ WITHIN THE MULTI-DIMENSIONAL SPACE OF THE   │
│ RBF NETWORK A BOUNDARY THAT IS ASSOCIATED   │
│ WITH THE NEW GESTURE CATEGORY AND DEFINED   │
│         BY THE FEATURE VECTOR               │
└─────────────────────────────────────────┘
           ↓
┌─────────────────────────────────────────┐
│ ASSOCIATE BOUNDARY WITH NEW COMPUTER COMMANDS │─ 1250
└─────────────────────────────────────────┘
           ↓
         RETURN
```

FIGURE 12

METHOD AND SYSTEM FOR GESTURE CATEGORY RECOGNITION AND TRAINING USING A FEATURE VECTOR

BACKGROUND OF THE INVENTION

1. Field of the Invention

The present invention relates to the field of computer implemented user interfaces. More specifically, the present invention relates to the field of computer implemented recognition of user input information.

2. Related Art

In modern computing technology, there is always a need to provide mechanisms to facilitate user interaction with computing devices. By increasing the mechanisms by which persons interact with computer systems, the number of potential computer users and the number of potential computer applications expand. Further, by facilitating user interface mechanisms, applications become easier to use and more efficient. Today, users can communicate with computer systems using a number of various devices including refreshable display screens (cathode ray tubes, liquid crystal displays etc.), alphanumeric keyboards, keypads, cursor directing devices, microphones, etc. Keyboards are used for conveying information in alphanumeric form to a computer from a user.

The cursor directing device is used in conjunction with an animated cursor image that is rendered on the display screen. The cursor image is animated in that it can move across the display screen in real-time tracing the motion of the cursor directing device. Cursor directing devices, e.g., mouse devices, trackballs, etc., are used to direct the position of the cursor image on a display screen according to user interaction. In operation, a hand held or user directed mouse device is displaced across a mouse pad and the corresponding displacement and direction are simultaneously traced out by the cursor image as rendered on the display screen. When the cursor image is directed over a particular portion of the display screen, one or more buttons on the mouse device can be depressed to "activate" the cursor image which generally invokes a computer action related to the screen portion. The areas on the display screen that invoke a computer command when the cursor image is positioned thereon and activated have been called "hot spots." In the past, to convey information to the computer system, cursor directing devices have been used in conjunction with hot spots located on the display screen.

More particularly, when the cursor image is activated in prior art user interfaces, the computer system performs a relatively routine task of checking the screen coordinates of the cursor image against the screen coordinates of a number of recorded hot spots to determine which enabled hot spot was selected by the cursor activation. In performing the check to determine which hot spot is selected, the computer system typically does not care about the screen path in which the cursor image passes through in order to reach the hot spot. Further, in performing the check to determine which hot spot is selected, the computer system typically does not care about the speed in which the cursor image was directed to the hot spot. All that is checked by the computer system is the screen coordinate of the cursor image when the cursor image is activated (e.g., when a mouse button is depressed). Thus, in the past, the real-time displacements of the mouse device between mouse activations are largely ignored.

Since the cursor directing device allows a substantial amount of real-time free style user-directed movement within the plane of the mouse pad, it would be advantageous to provide a user interface mechanism that could make use of more information from the cursor directing device than merely the display screen coordinate of the cursor image upon cursor activation.

Accordingly, the present invention provides a system and method of interfacing a user with a computer system that provides more information to the computer system from a cursor directing device than merely the screen coordinate of the cursor image upon cursor activation. The present invention provides a system and method of interfacing a user with a computer system that conveys information regarding the path through which a cursor directing device is spatially displaced and the relative speed of such spatial displacement. The above information provides a unique and advantageous mechanism by which information can be conveyed to the computer system from the user. These and other advantages of the present invention not specifically mentioned above will become clear within discussions of the present invention presented herein.

SUMMARY OF THE INVENTION

A computer implemented method and system are described for gesture category recognition and training. In one embodiment, a cursor directing device is used. Generally, a gesture is a hand or body initiated movement of a cursor directing device which outlines a particular pattern, in particular directions, and can comprise one or more strokes. The present invention allows a computer system to accept input data, originating from a user, in the form gesture data that are made using a cursor directing device. In one embodiment, a mouse device is used, but the present invention is equally well suited for use with other cursor directing devices (e.g., a track ball, a finger pad, an electronic stylus, optical tracking device, etc.). In one embodiment, the computer system is queued to accept a new gesture data by pressing a key on the keyboard and then moving the mouse (e.g., while a mouse button is depressed) to trace out a gesture that is associated with a gesture category. Coordinate position information of the mouse and time stamps are recorded as gesture data in memory based on the user gesture. More than one gesture can be associated with a gesture category (e.g., as negative and positive examples).

The present invention then determines a multi-dimensional feature vector based on the gesture data. The multi-dimensional feature vector is then passed through a gesture category recognition engine that, in one implementation, uses a radial basis function neural network to associate the feature vector to a preexisting gesture category. Once identified, a set of user commands that are associated with the gesture category (e.g., a macro) are applied to an application of the computer system. The user commands can originate from an automatic process that extracts commands that are associated with the menu items of a particular application program. The present invention also allows user training so that userdefined gesture categories, and the computer commands associated therewith, can be programmed into the computer system.

More specifically, an embodiment of the present invention includes a method of providing a user interface in an electronic system having a processor, a memory unit, an alphanumeric input device, the method comprising the computer implemented steps of: a) receiving gesture data representing a gesture performed by a user with the cursor directing device, the gesture data comprising coordinate positions and timing information and having one or more individual strokes; b) generating a multi-dimensional feature vector based on the gesture data; c) providing the multi-dimensional feature vector to a radial basis function neural network for recognition, the radial basis function neural network associating the multi-dimensional feature vector with a gesture category from a predefined plurality of gesture categories and supplying the gesture category as an output value; and d) applying a set of predetermined commands to the electronic system, the set of predetermined commands being associated with the gesture category output from the radial basis function neural network.

Embodiments include the above and wherein the step b) comprises the steps of: b1) normalizing the gesture data; b2) dividing each stroke of the gesture data into a plurality of segments, N; b3) determining first feature elements for each stroke of the gesture data based on an end point of a respective stroke and a start point of a next stroke; b4) determining second feature elements for each segment of each stroke of the gesture data based on an orientation of each segment with respect to a reference line, wherein the multi-dimensional feature vector comprises: the number of strokes of the gesture data; the first feature elements; and the second feature elements.

BRIEF DESCRIPTION OF THE DRAWINGS

FIG. 12 illustrates a flow chart of steps in accordance with one embodiment of the present invention for gesture category training.

DETAILED DESCRIPTION OF THE INVENTION

In the following detailed description of the present invention, a system and method for gesture category recognition within a computer system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer Syetem 112

Aspects of the present invention, described below, are discussed in terms of steps executed on a computer system (e.g., process 800, process 1200 and process 1300).

Figure 1:
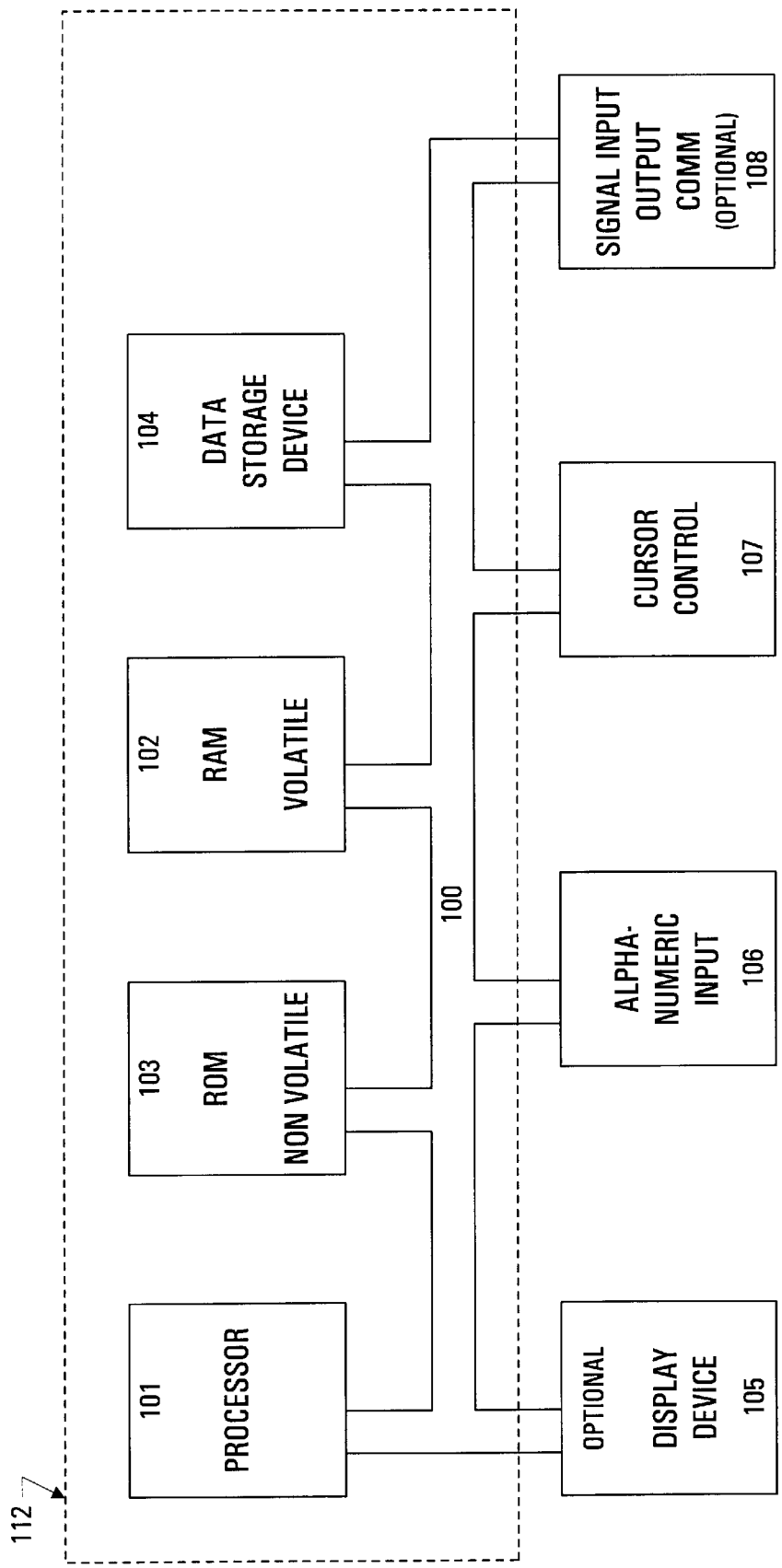
FIG. 1 illustrates a general purpose computer system in which embodiments of the neural network based gesture category recognition process of present invention can be implemented.

Although a variety of different computer systems can be used with the present invention, an exemplary computer system 112 is shown in FIG. 1.

In general, computer systems 112 that can be used by the present invention comprise an address/data bus 100 for communicating information, a central processor 101 coupled with the bus for processing information and instructions, a volatile memory 102 (e.g., random access memory) coupled with the bus 100 for storing information and instructions for the central processor 101 and a non-volatile memory 103 (e.g., read only memory) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 is an alphanumeric input device 106 including alphanumeric and function keys coupled to the bus 100 for communicating information and command selections to the central processor 101. Generally, alphanumeric input device 106 is called a keyboard or keypad. System 112 also includes a cursor control or directing device 107 coupled to the bus for communicating user input information and command selections to the central processor 101. The cursor directing device 107 is typically displaced through user movement which causes a cursor image displayed on screen 105 to move accordingly. Within the context of the present invention, the cursor directing device 107 can include a number of implementations including a mouse device, for example, a trackball device, a joystick, a finger pad (track pad), an electronic stylus, an optical beam directing device with optical receiver pad, an optical tracking device able to track the movement of a user's finger, etc., or any other device having a primary purpose of moving a displayed cursor across a display screen based on user displacements.

Using a mouse device, the mouse 107 is moved by a user's hand relative to a fixed pad thereby causing the cursor to move with respect to the mouse movement. As the mouse is moved, in real-time, coordinate displacement information is sent to the computer system. The computer 112 samples the displacements over a selected sampling frequency and therefore each coordinate displacement is associated with a particular time stamp. Therefore, for each sample an (x, y) coordinate displacement is recorded along with a relative timestamp. This information can be stored in computer memory 102 as gesture data.

Computer system 112 of FIG. 1 can also include an optional signal generating device 108 coupled to the bus 100 for interfacing with other networked computer systems. The display device 105 of FIG. 1 utilized with the computer system 112 of the present invention may be a liquid crystal device, other flat panel display, cathode ray tube, or other display device suitable for creating graphic images and alphanumeric .characters recognizable to the user. In one embodiment of the present invention, computer system 112 is a Windows Operating System based computer system having an x86 architecture processor 101.

Gesture Category Recognition System of the Present Invention

Figure 2:
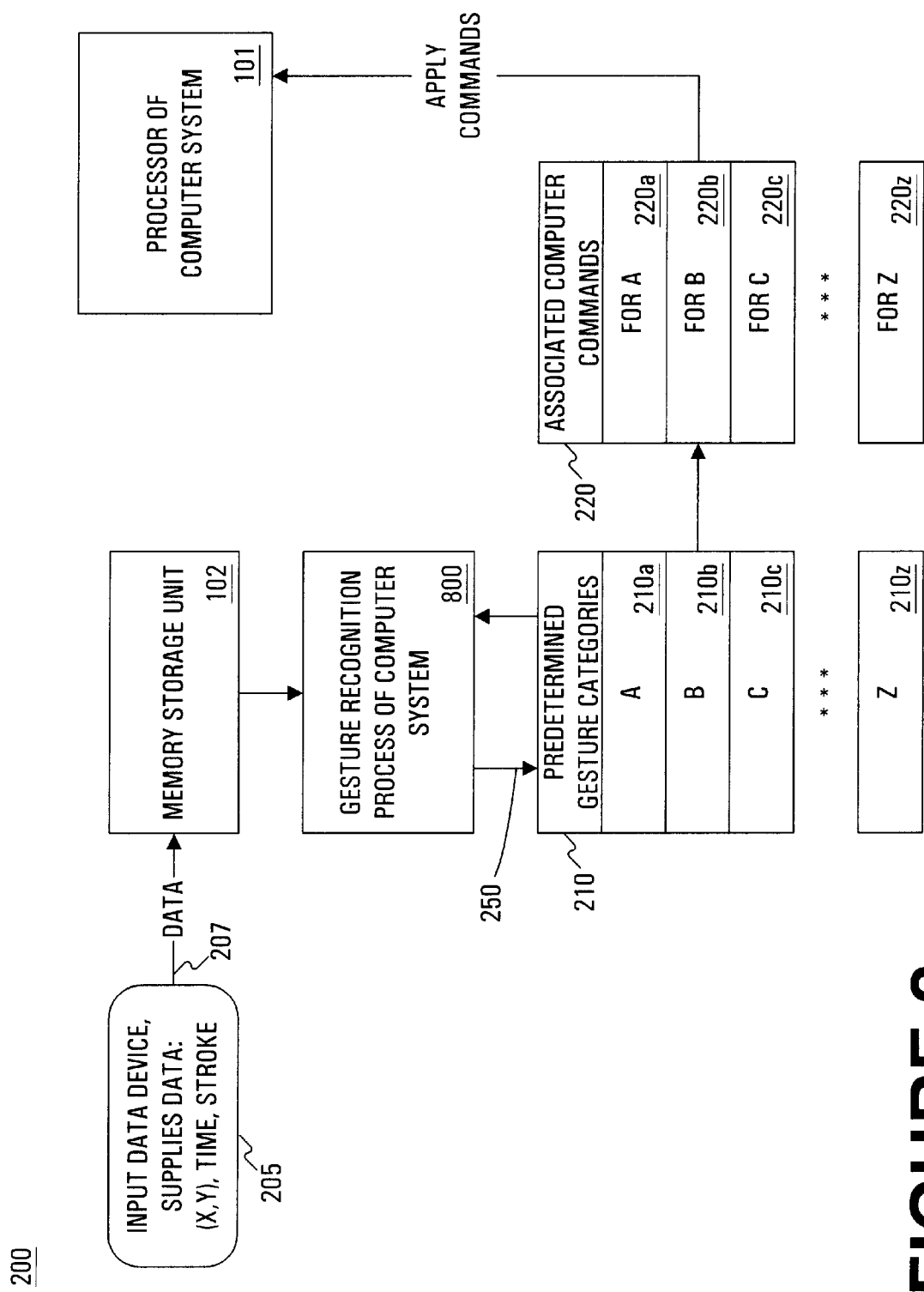
FIG. 2 is a high level data flow diagram of aspects of the gesture category recognition process of the present invention.

With reference to FIG. 2, a high level data flow diagram 200 of the present invention gesture category recognition system is illustrated. User-originated gesture data is received at 205 from the cursor directing device 107 (FIG. 1). At 205, the user indicates to the computer system 112 that a gesture is to be input and then inputs the gesture data. The term "gesture data" includes a variable-sized set of points of space of any dimension, parameterized with time and relates to a user movement called a "gesture." The movement can be any movement continuous or discontinues of any object in space of any dimension, and includes the intentional movement made by hand used for symbolic communication. Continuous parts of the gesture, disconnected form each other, are referred to as strokes. The term "input gesture" is gesture data that needs recognition. In this context, an input gesture can be viewed as gesture vectors because coordinate position and timing information can be used to differentiate gestures.

The term "gesture category" corresponds to a predetermined category or "name" defined by a user. The "gesture category" can have multiple different gestures defined within as samples (e.g., examples). There can be positive examples and negative examples used to define the gesture category. The samples expand the space of the gesture category and during recognition, the present invention attempts to associate an input gesture to a particular pre-defined gesture category. Computer commands can also be associated with a gesture category.

In one embodiment of the present invention, the gesture data is formed by the user displacing a mouse device over a fixed surface (e.g., a mouse pad). As the cursor directing device 107 is displaced during gesture input, real-time coordinate displacement information in (x, y) format is forwarded to the computer system 112. The computer system 112 timestamps the coordinate information based on sample points and a sample frequency. As shown, coordinate (x, y) and timestamp information 207 is then stored in a computer readable memory unit 102 of the computer system 112.

It is appreciated that in one embodiment of the present invention, a particular key on the keyboard 106 is depressed to gather the gesture data. The keyboard 106 is used as a trigger to indicate to the computer system 112 that gesture data is to be input. When the key is released, the gesture is then complete.

When configured to performed gesture category recognition, a computer implemented gesture category recognition process 800 of FIG. 2 receives the gesture data 205, transforms the gesture data 205 into a feature vector and uses the feature vector for determining which of a number of predefined gesture categories best represents the gesture data 205. As shown in FIG. 2, a number of predefined gesture categories 210 are stored in a computer readable memory unit (e.g., unit 102). In the example of FIG. 2, predefined gesture categories 210a–210z exist. As described further below, each gesture category has an associated "bounded area" within a multi-dimensional space of the neural network. The multi-dimensional space is indexed by the input feature vector. The gesture category recognized by the gesture category recognition process 800 of the present invention depends on which bounded area is pointed to by the feature vector of the gesture data 205.

The gesture category that is recognized by the gesture category recognition process 800 of the present invention is referred to as the output gesture category. In the example of FIG. 2, gesture category 210b is the output gesture as represented by arrow 250. List 220, maintained in computer readable memory 102, includes a separate entry, e.g., 220a–220z, for each of the predefined gesture categories of list 210. Each entry within database 220 represents a set of computer commands, e.g., instructions and/or commands of a macro, that are to be applied to computer system 112 when the user inputs the gesture that corresponds to that set of commands. FIG. 2 illustrates the commands being applied to an application executed by processor 101 (FIG. 1). An optional confirmation can be required before certain commands are applied (e.g., those that alter or remove information from computer system 112). For example, the set of commands within 220b corresponds to predefined gesture category 210b. When the input gesture is recognized and represented by output gesture category is 210b, then the set of commands 220b are applied to processor 101. The same is true for each of the predefined gesture categories 210a–210z and their corresponding sets of computer commands 220a–220z.

As such, when configured for gesture category recognition (and not in training mode), the typical usage of the present invention is the following. A user manipulates the cursor directing device 107 (e.g., mouse) in such a way as to create gesture data and then, once recognized, a corresponding set of computer commands are automatically applied to processor 101. For instance, each time a user wants a word processor application to save a document, the mouse device 107 is displaced to trace out a predetermined gesture, recognized as one of the gesture categories, and the application program is automatically directed to save. Alternatively, each time a user wants to read electronic mail, a different predetermined gesture is traced out with the mouse device 107 causing computer system 112 to interface with an external system (e.g., the email application on the internet) which then downloads the required mail.

Figure 3:
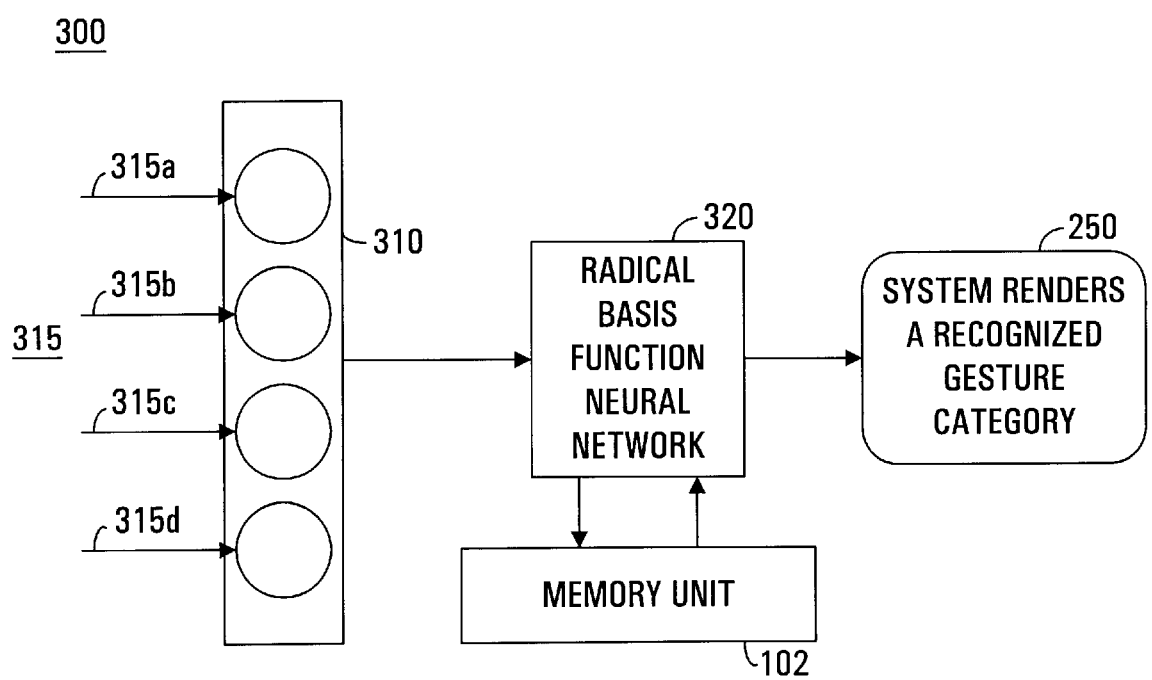
FIG. 3 is a high level data flow diagram of the gesture category recognition engine of the present invention using a radial basis function neural network.

FIG. 3 illustrates a data flow diagram 300 of elements used by the gesture category recognition process 800 of the present invention. The feature vector 310 corresponds to the gesture data 205. Feature vector 315 is multi-dimensional and as such is made up of several feature elements represented by exemplary feature elements 315a–315d. As described further below, each element of 315a–315d is derived according to the process 800 of FIG. 8A and FIG. 8B. The feature vector 315 is input to a neural network 320 that, in one embodiment, utilizes a radial basis function to identify the output gesture category. The radial basis function neural network 320 interfaces with a multi-dimensional space, stored in memory unit 102, that is filled with boundary areas; each bounded area corresponds with a particular predetermined gesture category. The size of the bounded area depends on the number of example gestures defined as associated with the gesture category and the number of predefined gesture categories.

The radial basis function as applied within a neural network 320 is a well known process for performing recognition. It is described in one work entitled "Introduction to Radial Basis Function Networks" by Mark J. L. Orr, published by the Centre for Cognitive Science, University of Edinburgh, 2, Buccleuch Place, Edinburgh EH8 9LW, Scotland. In the radial basis function neural network 320, the multi-dimensional feature vector 315 is applied within the multi-dimensional space and points within this space to a particular location. This location can be positioned within one of the bounded areas of the multi-dimensional space. The predetermined gesture that corresponds to this bounded area is then the output gesture 250.

EXAMPLE GESTURES

Figure 4A:
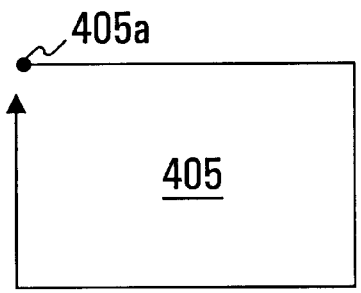
FIGS. 4A, 4B, 4C and 4D illustrate exemplary geometric gestures that can be used in accordance with the present invention.

FIGS. 4A, 4B, 4C and 4D illustrate some exemplary "single stroke" geometric gestures that can be used in accordance with the present invention. It is appreciated that almost any geometric pattern can be used as a gesture within the present invention and that the following gestures are exemplary only. These gestures are "single stroke" because they can be made while holding down the mouse button and using a single continuous mouse movement. Exemplary gesture 405 of FIG. 4A is generally a square shape and made by starting at position 405a and tracing the cursor directing device 107 clock-wise through the square shape to the end (the arrow). It is appreciated that in one embodiment of the present invention, a particular key on the keyboard 106 is depressed while the gesture is being traced out on the cursor directing device 107.

Figure 4B:
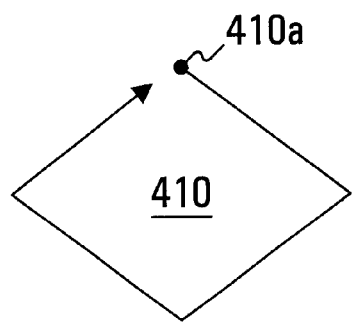
Figure 4C:
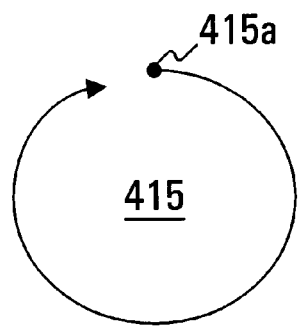
Figure 4D:
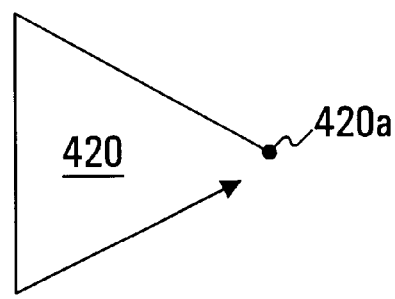

Exemplary gesture 410 of FIG. 4B is generally a diamond shape and made with the cursor directing device 107 starting at position 410a on the mouse pad and tracing the cursor directing device 107 clock-wise through the diamond shape to the end (the arrow). Exemplary gesture 415 of FIG. 4C is generally a circle in shape and is made starting at position 415a and tracing the cursor directing device 107 clock-wise in the circle shape to the end (the arrow). Exemplary gesture 420 of FIG. 4D is generally a triangle shape and made with the cursor directing device 107 starting at position 420a on the mouse pad and tracing the cursor directing device 107 counter clock-wise through the triangle shape to the end (the arrow).

In each of the exemplary gestures 405, 410, 415 and 420, the speed of displacement of the cursor directing device 107 is maintained relatively uniform through the gesture. Typically, when using a key of the keyboard 106 as the gesture triggering event (described below), the position of the cursor directing device 107 when the key is depressed is used to indicate the start position (e.g., 405a, 410a, 415a and 420a). Gestures 405, 410, 415 and 420 are generally closed geometry because the ends return to the start points (405a, 410a, 415a and 420a). A gesture need not be closed in geometry within the present invention.

Figure 5A:
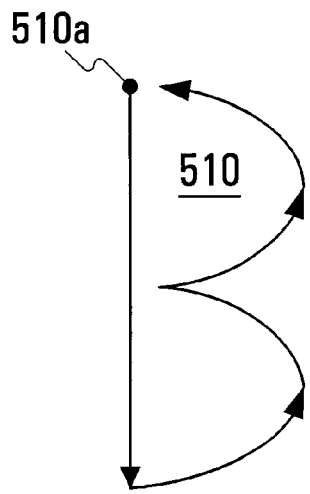
FIGS. 5A, 5B and 5C illustrate exemplary alphabetical gestures that can be used in accordance with the present invention.
Figure 5B:
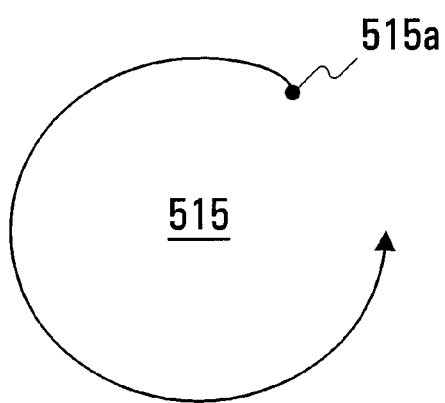
Figure 5C:
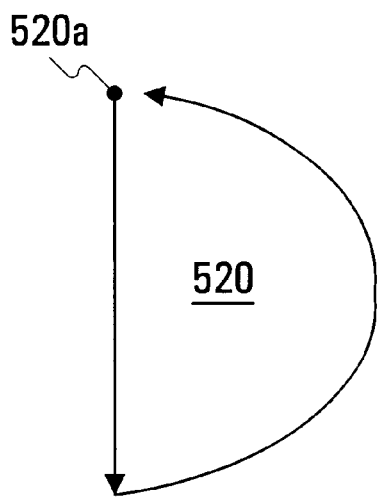

FIGS. 5A, 5B, and 5C illustrate some exemplary alphanumeric gestures that can be used in accordance with the present invention. It is appreciated that almost any alphanumeric pattern can be used as a gesture within the present invention and that the gestures of FIGS. 5A, 5B and 5C are exemplary only. Exemplary gesture 510 of FIG. 5A is generally in the shape of a "B" and is made starting at position 510a and tracing the cursor directing device 107 counter clock-wise in the "B" shape to the end (the arrow). Gesture 510 is a "double stroke" gesture requiring two separate strokes of the mouse 107 and releasing the mouse button in between strokes. Exemplary gesture 515 of FIG. 5B is generally in the shape of a "C" and is made starting at position 515a and tracing the cursor directing device 107 counter clock-wise in the "C" shape to the end (the arrow). In this case, the gesture 515 is an open geometry because the end does not return to the start 515a. Exemplary gesture 520 of FIG. 5C is generally in the shape of a "D" and is made starting at position 520a and tracing the cursor directing device 107 counter clock-wise in the "D" shape to the end (the arrow). Gesture 520 is a "double stroke" gesture requiring two separate strokes of the mouse 107 and releasing the mouse button in between strokes. It is appreciated that each of the gestures 510, 515 and 520 could also be drawn in the clock-wise direction which yields different gesture definitions.

Figure 6A:
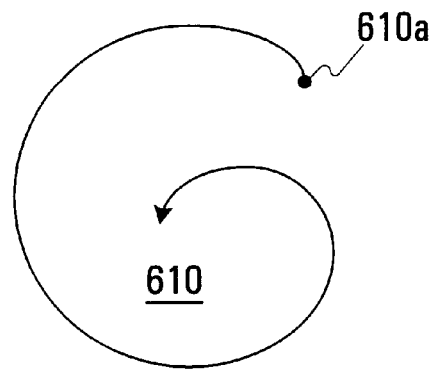
FIGS. 6A, 6B and 6C illustrate further exemplary alphabetical gestures that can be used in accordance with the present invention.
Figure 6B:
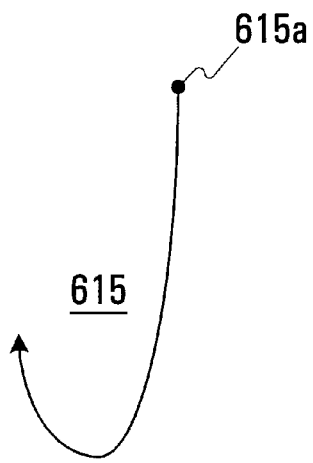
Figure 6C:
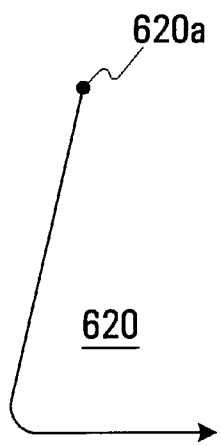

FIGS. 6A, 6B, and 6C illustrate additional exemplary alphanumeric gestures that can be used in accordance with the present invention. Exemplary gesture 610 of FIG. 6A is generally in the shape of a "G" and is made starting at position 610*a* and tracing the cursor directing device 107 counter clock-wise in the "G" shape to the end (the arrow). Exemplary gesture 615 of FIG. 6B is generally in the shape of a "J" and is made starting at position 615*a* and tracing the cursor directing device 107 clock-wise in the "J" shape to the end (the arrow). Exemplary gesture 620 of FIG. 6C is generally in the shape of an "L" and is made starting at position 620*a* and tracing the cursor directing device 107 counter clock-wise in the "L" shape to the end (the arrow). It is appreciated that gestures 610 and 620 can also be drawn in the clock-wise direction which would yield different gesture definitions. Further, gesture 615 can also be drawn in the counter clock-wise direction which would yield a different gesture definition in accordance with the present invention.

Gesture Differentiation

Figure 7A:
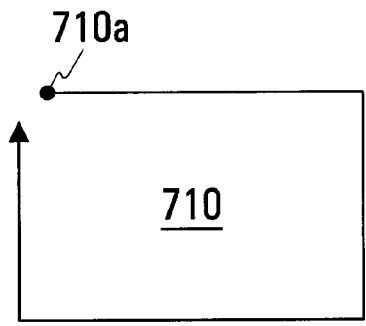
FIGS. 7A and 7B illustrate gesture differentiation based on displacement direction.
Figure 7B:
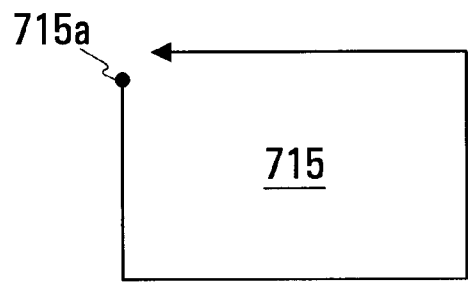

FIG. 7A and FIG. 7B illustrate two exemplary gestures 710 and 715, respectively. Gestures 710 and 715 illustrate that in accordance with the present invention, gestures can be differentiated based on the displacement direction by which they are traced using displacements of the cursor directing device 107. For example, both gestures 710 and 715 are square in shape and of the same relative dimensions. However, gesture 710 is formed from start point 710*a* in a clock-wise direction while, in contrast, gesture 715 is formed from (the same) start point 715*a* in a counter clock-wise direction. The manner in which gestures are decomposed to form a feature vector within the present invention preserves information regarding the direction in which a gesture is traced using displacements of the cursor directing device 107. Therefore, gestures can be differentiated based on trace direction.

Figure 7C:
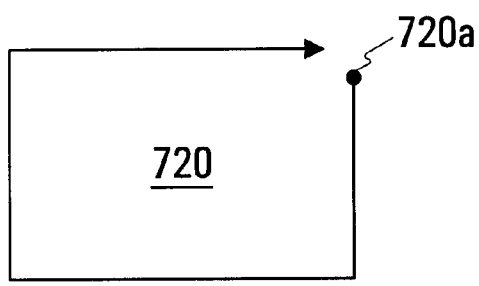
FIGS. 7C and 7D illustrate gesture differentiation based on starting point and displacement speed, respectively.

FIG. 7A and FIG. 7C illustrate gestures 710 and 720, respectively. Gestures 710 and 720 illustrate that in accordance with the present invention, gestures can be differentiated based on their start points. For example, both gestures 710 and 720 are square in shape, of the same relative dimensions, and both are traced in the same direction (clock-wise). However, gesture 710 is formed from start point 710*a* (upper left) while, in contrast, gesture 720 is formed from start point 720*a* which is located in the upper right. The manner in which gestures are decomposed to form a feature vector within the present invention preserves information regarding the relative time in which each segment of the gesture is made. For instance, the upper left corner of gesture 710 is formed first while the upper left portion of gesture 720 is formed three quarters in time into the total time required to form gesture 720. Therefore, gestures can be differentiated based on their relative start positions within the present invention.

Figure 7D:
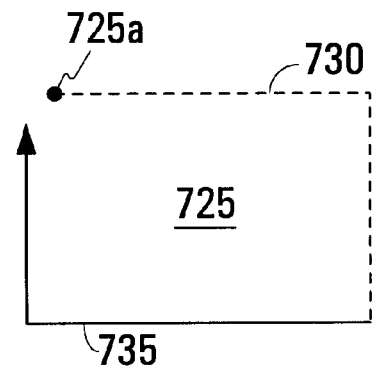

FIG. 7A and FIG. 7D illustrate gestures 710 and 725, respectively. Gestures 710 and 725 illustrate that in accordance with the present invention, gestures can be differentiated based on the speed in which different parts of the gesture are formed using displacements of the cursor directing device 107. For example, both gestures 710 and 725 are square in shape, of the same relative dimensions and have the same start point. However, gesture 710 is formed from start point 710*a* (upper left) at a relatively uniform creation speed throughout. That is to say, the cursor directing device 107 is moved at a relatively uniform speed across the mouse pad (for example) as the rectangle is formed. In contrast, gesture 725 is formed from start point 725*a* which is located in the upper right and the top right corner portion 730 is formed using a very fast stroke while the bottom left corner portion 735 is formed using a much slower stroke. The manner in which gestures are decomposed to form a feature vector within the present invention preserves information regarding the relative times in which the start and end points of a stroke of a gesture are made. Therefore, gestures can be differentiated based on speeds in which different sections of the gesture are made.

As shown below, gestures can also be differentiated based on the number and type of strokes that are used to make up the gesture. The following discussion describes the gesture category recognition and training modes available within the embodiments of the present invention.

Gesture Category Recognition Process 800

Figure 8A:
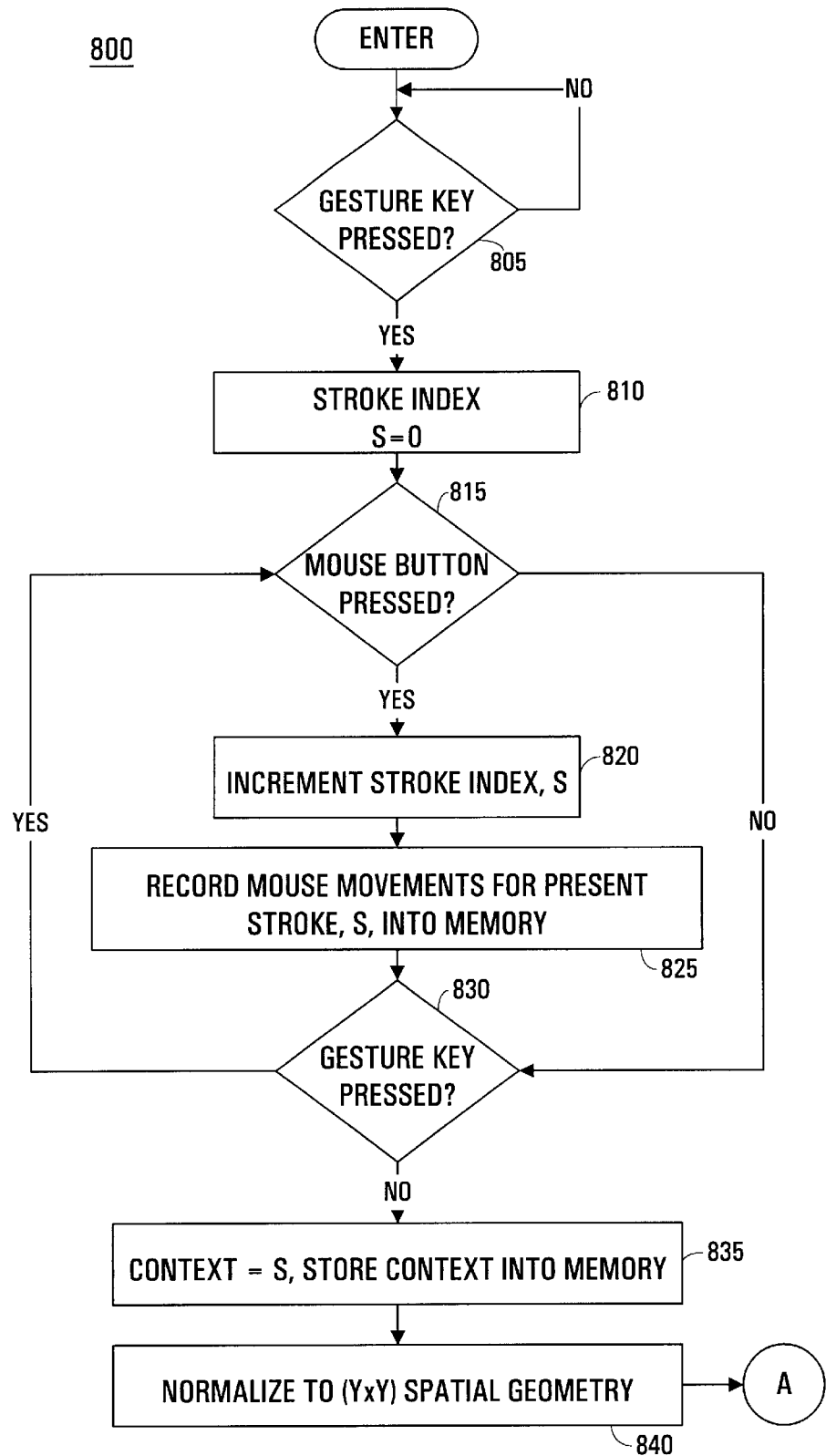
FIG. 8A, FIG. 8B and FIG. 8C illustrate a flow chart of steps used in the gesture data input and gesture category recognition processes of the present invention.
Figure 8B:
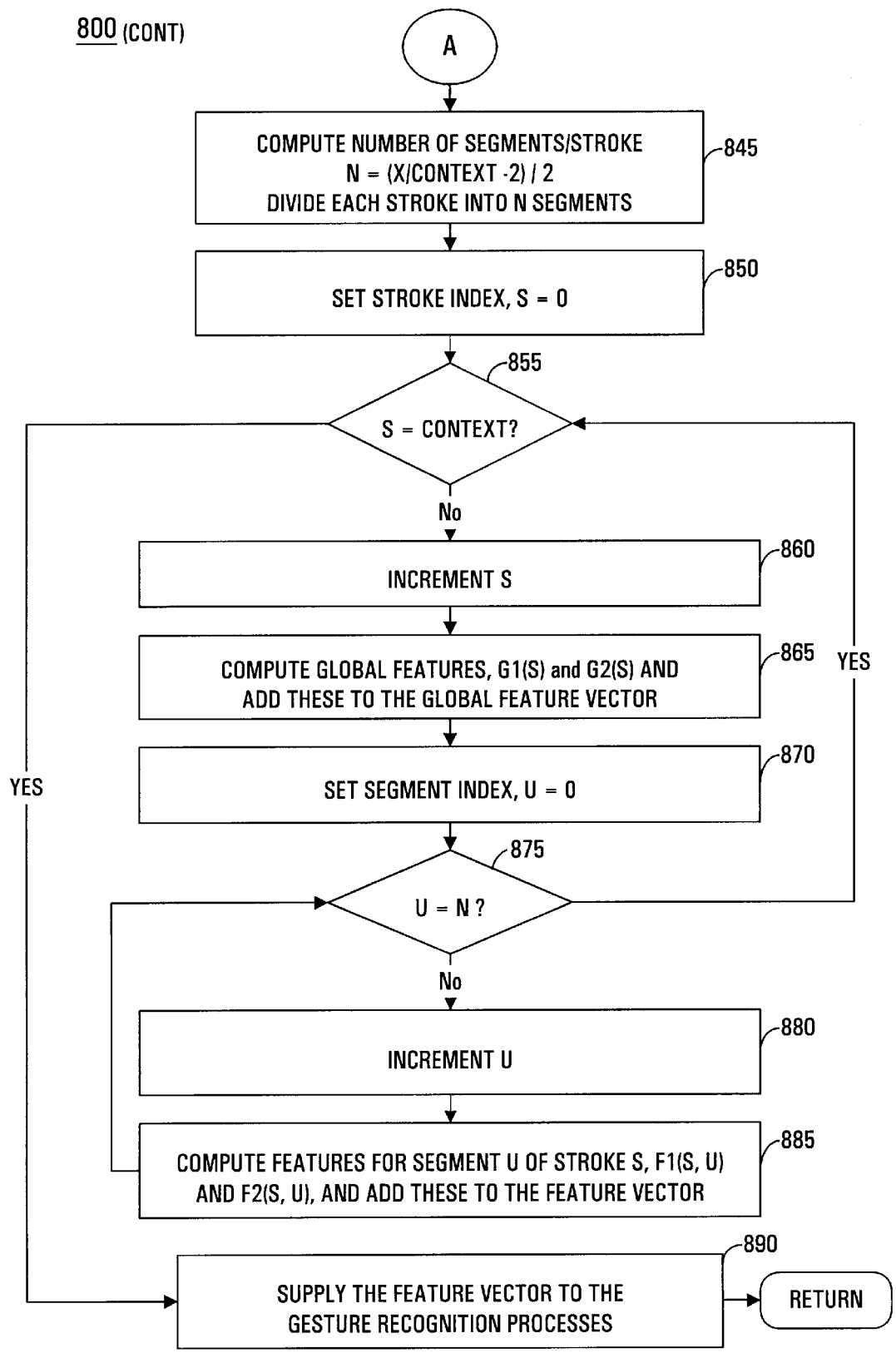
Figure 8C:
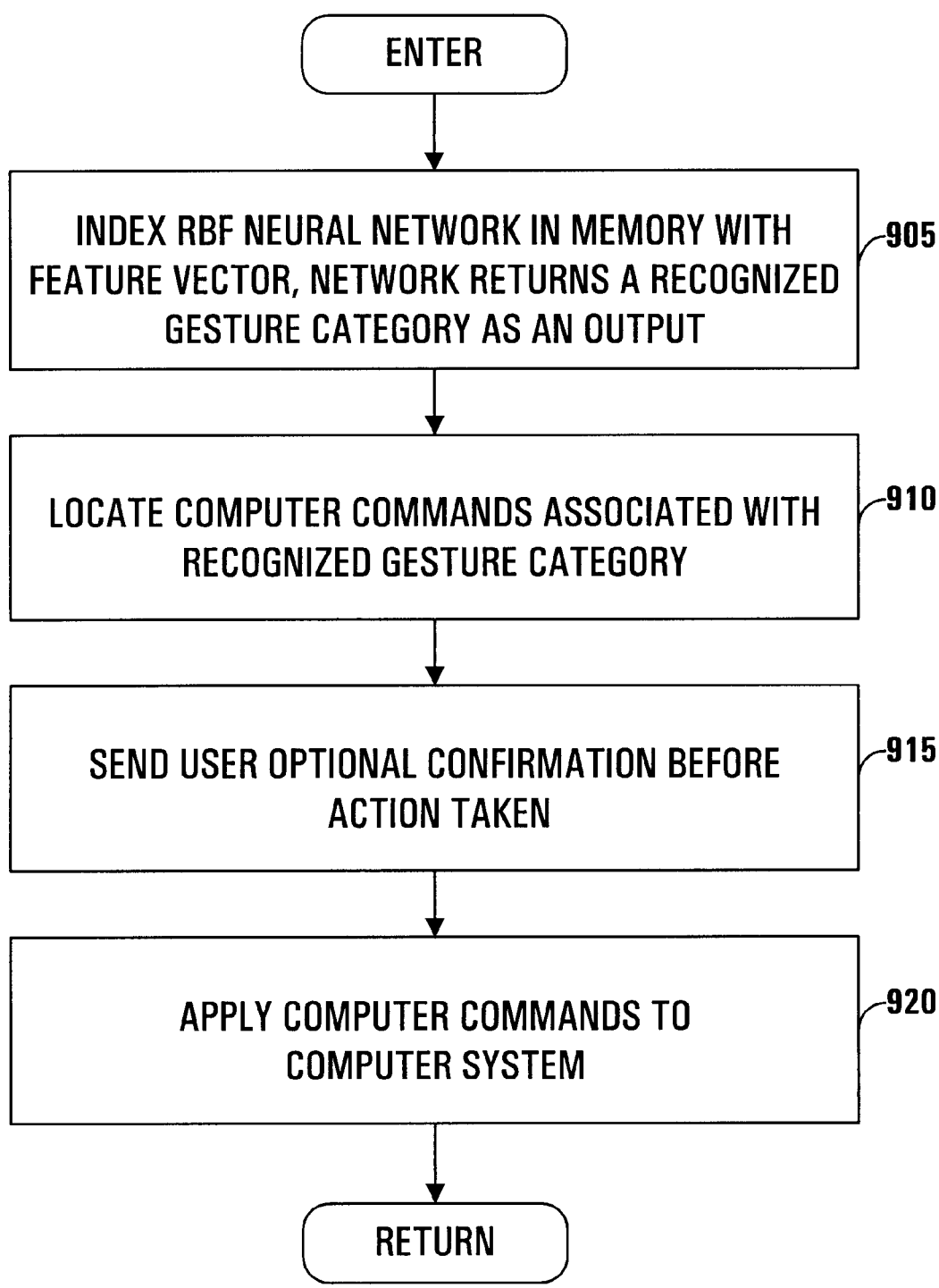

FIG. 8A, FIG. 8B and FIG. 8C illustrate steps within gesture category recognition process 800 of the present invention. It is appreciated that process 800 is implemented by computer system 112 executing instructions that are stored in a computer readable memory unit (e.g., unit 102). Process 800 can operate in the background simultaneously with other application programs that are running in system 112. Process 800 is invoked upon a user selecting the gesture category recognition mode of the present invention (as opposed to gesture training modes described further below).

Referring to FIG. 8A, process 800 commences at step 805. At step 805, the present invention checks if a triggering event occurs. The triggering event is typically user initiated and indicates to the present invention that a gesture is to be input and needs to be captured for recognition. In one embodiment, the triggering event is accomplished when the user holds down a gesture key (the trigger event key) on the keyboard 106 while moving the cursor directing device 107 with the mouse button pressed. Any keyboard key can be defined as the gesture or trigger key. It is appreciated that the present invention is equally suited to respond to a number of different triggering events. For instance, one triggering event can be defined by a particular set of mouse buttons that are depressed while the mouse device is moved. The triggering event can also originate from a user spoken command or other unique user interface mechanism. Process 800 returns until the trigger event is detected at step 805.

Upon detection of the trigger event at 805, step 810 is entered. At step 810, the present invention sets a stroke index, s, to zero. The stroke index, s, is used to account for the number of strokes within the input gesture. A stroke is a part of the mouse input while the mouse button is continuously pressed. Strokes can be generated by taking the sections of the mouse input where the mouse button is pressed continuously. At step 815, process 800 checks if the mouse button of mouse 107 is pressed. If it is not pressed, then step 830 is entered. If the mouse button is pressed at step 815, then step 820 is entered where the stroke index, s, is incremented by one to indicate a first stroke of the input gesture data.

Step 825 is then entered where the gesture data is recorded into memory 102. The gesture data is associated with the particular stroke indicated by the stroke index, s. The present invention utilizes a number of well known mechanisms by which cursor directing information is received by computer system 112 and stored into a computer memory 102.

Step 825 continues while the mouse button remains pressed so that the gesture's stroke can be recorded. In one embodiment, a mouse device is used as cursor directing device 107. The mouse device transmits coordinate (x, y) position information to the computer system 112 which is sampled at a predetermined sample rate over time. From the trigger event, each coordinate position data from the mouse device is recorded in memory 102 along with its associated timestamp. In one implementation of step 825, the WM_MOUSEMOVE Windows message is handled, and the device coordinates are transformed into the logical coordinates (x, y) by the CDC::DPtoLP MFC function. The length of this sequence is about 200 for a typical gesture's stroke.

When the mouse button is released, but the gesture key is still depressed, step 830 is held until the mouse button is pressed again at step 815 of FIG. 8A. In this case, step 820 is entered which increments the stroke index, s, and another stroke of the input gesture is obtained at step 825. However, if the mouse button is released and also the gesture key is no longer pressed, then step 835 is entered. At time, all of strokes (if more than one) of the gesture are captured and the input gesture is done. The variable, context, is set equal to s which is the number of captured strokes and the variable context is recorded into memory 102.

Figure 9A:
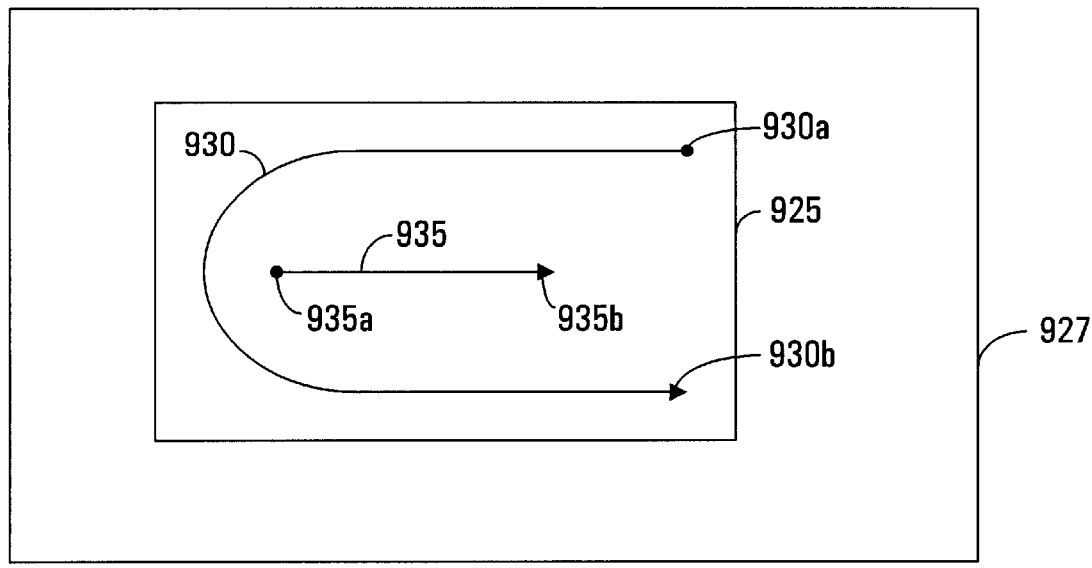
FIG. 9A and FIG. 9B are logical diagrams which illustrate gesture data input and normalization in accordance with the present invention.

From the relative coordinate displacement information stored in memory 102, a two dimensional spatial path, through which the strokes of the input gesture are formed, is recorded by the computer system 112. Each bit of data is also tagged with a stroke tag indicating the stroke number to which it is associated. The data representing the (x, y) coordinates, timestamps and stroke tag for a particular input gesture is the "gesture data." FIG. 9A illustrates an exemplary two-stroke input gesture including a first stroke 930 (starting at 930a and ending a 930b) followed by a second stroke 935 (starting at 935a and ending at 935b). Outline 927 represents the two dimensional space of a typical mouse pad. The (x, y) coordinate space through which input gesture is made is recorded in memory 102.

At step 840 of FIG. 8A, the present invention determines a small spatial window in which the input gesture is stored. FIG. 9A illustrates the small window 925 that is determined by the present invention. This small window 925 is determined so that the displacement information of the input gesture can be normalized. In one embodiment of the present invention, the x-length of small window 925 is determined to be substantially the difference between the maximum x coordinate of the input gesture and the minimum x coordinate of the input gesture. The y-length of small window 925 is determined to be substantially the difference between the maximum y coordinate of the input gesture data and the minimum y coordinate of the input gesture data.

Figure 9B:
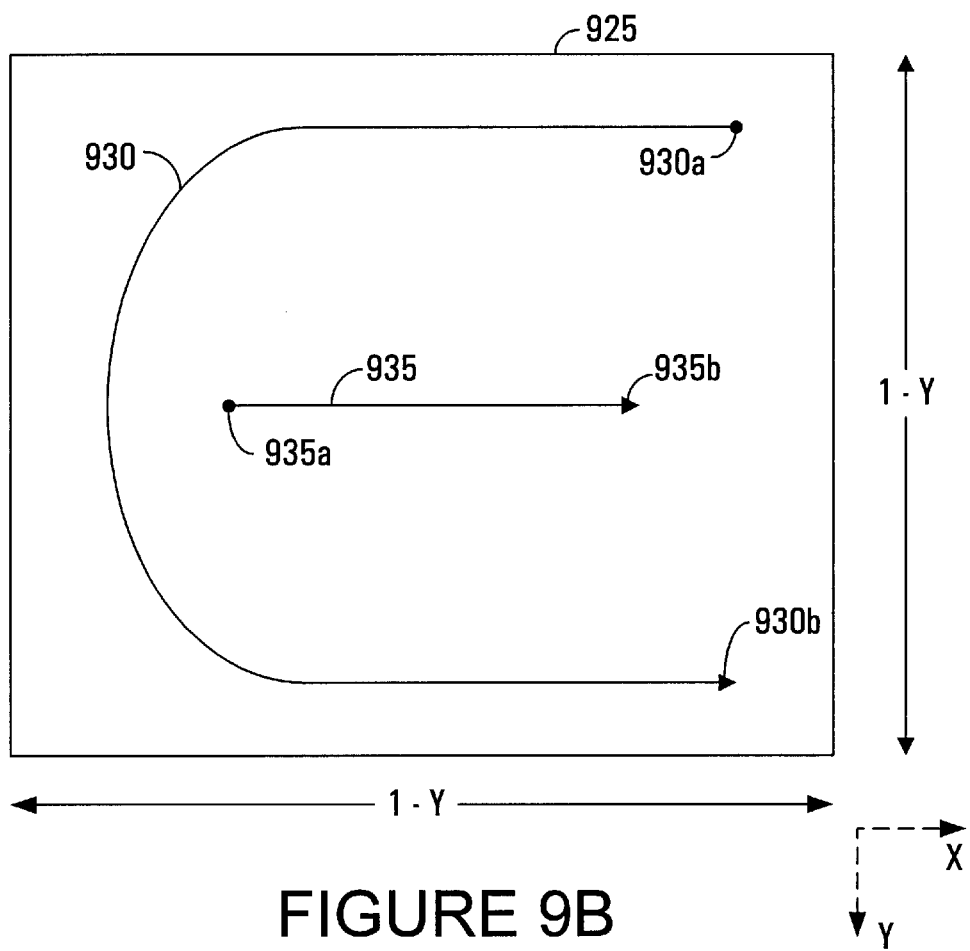

At step 840, each of the coordinates of the input gesture data are normalized according to a square 926 which is shown in FIG. 9B. The normalized square 926 contains Y divisions along the horizontal and Y divisions along the vertical. In one implementation Y is 1000, but could be any number as memory and processing speed allows. Normalization is performed as follows. The minimal and maximal x and y values (xmin, ymin, xmax and ymax) are determined by taking absolute values for all strokes and ignoring sections between strokes. Then MAX is set as the larger between xmax and ymax. All (x, y) values of the input gesture data are then scaled according to the following:

$$x'=Y*(x-xmin)/(MAX-xmin)$$

$$y'=Y*(y-ymin)/(MAX-ymin)$$

The input gesture data is then characterized by the new coordinates (x', y'). Optionally at step 840, the associated time stamps of all sample points of the gesture data are shifted such that they are each relative to the time of the start point 930a (FIG. 9A) of the input gesture data. For instance, the start point 930a is time (t=0).

Process 800 continues with step 845 of FIG. 8B where the number of segments, N, per stroke is determined. Each stroke is divided into the same number N of segments. Two feature elements are associated to each segment. The total number of feature elements (the length of the feature vector) is fixed in one embodiment, to a value, X. In one embodiment, the following is used to determine the number of segments, N, per stroke:

$$N=(X/context-2)/2$$

where context is the number of strokes of the input gesture and X is a maximum feature length, e.g., 24 in one implementation.

At step 845, the present invention divides each stroke into N separate segments along the stroke length. Although a number of methods could be used to divide a stroke into N segments, the following method is used in one embodiment. The number of coordinate pairs in a stroke is not necessarily an integer multiple of the number of segments in a stroke. Therefore, the segmentation of a stroke is done according to the following process. The starting point of the first segment is the first (x', y') pair of the stroke. The average size of a segment is determined by:

$$SegmentSize=(StrokeSize-1)/N$$

where StrokeSize is the number of coordinate pairs in the given stroke and N is the number of segments per stroke. The end-point of the ith segment is the nth coordinate pair in the stroke according to:

$$n=1+Round[(i-1)*SegmentSize]$$

and the Round function rounds its argument to the closest integer. The end-point of each segment is the starting point of the next segment. It follows from the above that the end-point of the Nth segment is the last coordinate pair of the stroke.

Figure 10A:
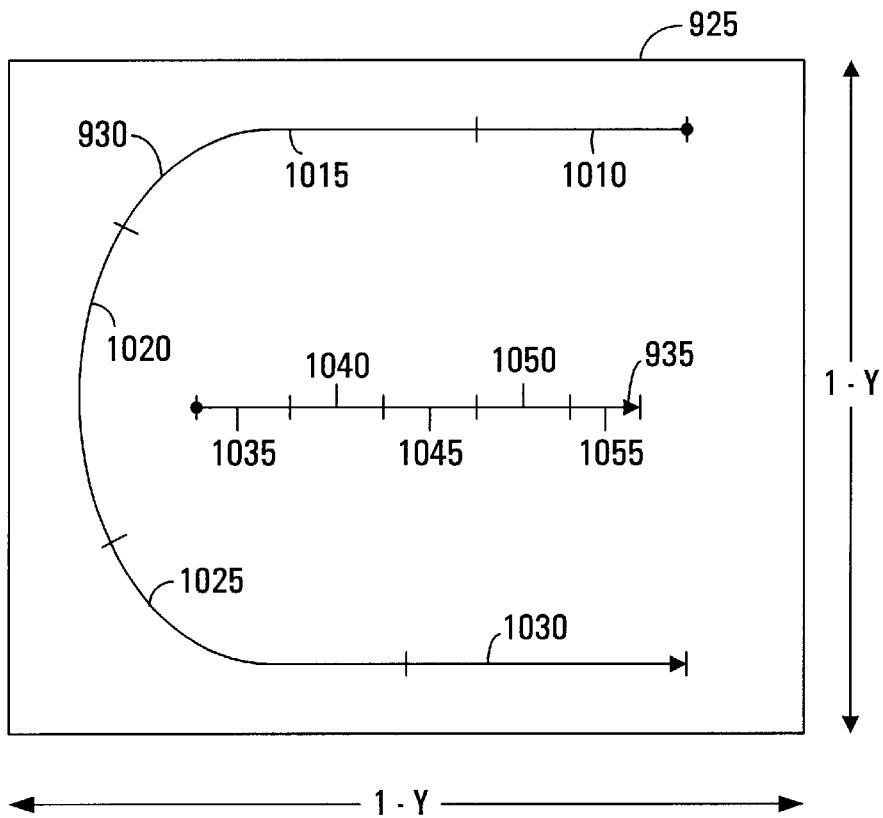
FIG. 10A illustrates an exemplary gesture being divided into an array of segments for computation of the feature vector in accordance with the present invention.

For example, as shown in FIG. 10A, stroke 930 is divided into N segments 1010–1030 and stroke 935 is divided into N segments 1035–1055 where N equals 5 in this example. In one embodiment of the present invention an input gesture is limited to three strokes maximum. In this embodiment: a single-stroke gesture has 11 segments per stroke; a double-stroke gesture has 5 segments per stroke; and a triple-stroke gesture has three segments per stroke. Each stroke is now analyzed by the present invention to determine feature vector elements associated with the strokes.

At step 850 of FIG. 8B the stroke index, s, is set to zero. At step 855, is it checked if the current stroke index, s, is equal the variable, context. If so, step 890 is entered and if not, step 860 is entered. At step 860, the stroke index, s, is incremented by one to select the first stroke (e.g., 930) on the first pass through. At step 865, the global features G1(s) and G2(s) are determined based on the current stroke, s, and the next stroke s+1. If the current stroke, s, is the last stroke, then the "next stroke" is the first stroke.

Global features, G1(s) and G2(s), code the relations between successive strokes. In particular, two feature elements are reserved for each stroke to store the distance vector between the current stroke's endpoint (e.g., 930b) and the next stroke's starting point (e.g., 935a). More specifically, if (Xc and Yc) are the last coordinate pair 930b in the current stroke, s, and (Xn and Yn) are the first coordinate pair 935a of the next stroke, s+1, then the global feature elements of the current stroke, s, are determined at step 865 according to:

$$G1(s)=(Xn-Xc)/H$$

$$G2(s)=(Yn-Yc)/H$$

where H is a normalization factor used because the rest of the feature elements are in a smaller range. Assuming Y is 1000, then H is 400 in one embodiment. Step 865 determines two feature elements per stroke.

Figure 10B:
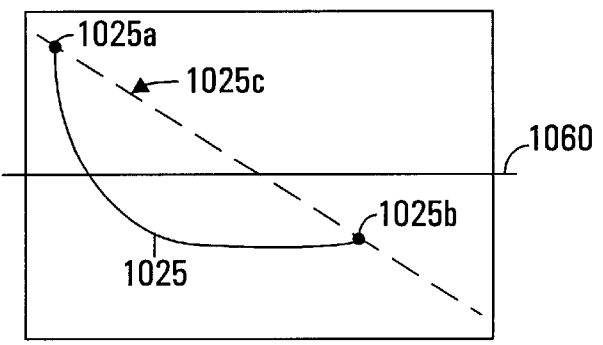
FIG. 10B illustrates an individual segment of a gesture being analyzed in accordance with the present invention for feature vector extraction.

Feature elements for the stroke segments are now computed. At step 870 of FIG. 8B, the present invention sets the segment index, u, to zero. At step 875, it is checked if u is equal to N. If so, step 855 is entered and if not, step 880 is entered. At step 880, the segment index, u, is incremented by one. At step 885 the feature elements for a particular segment, u, of a particular stroke, s, are determined. FIG. 10B illustrates a particular segment 1025 of a stroke 930. At step 875, each segment (e.g., 1025) is treated as if it was a straight line 1025c between its starting point 1025a and its end point 1025b. The two feature elements, F1(s, u) and F2(s, u), belonging to a segment are the sine and cosine values of the directed angle between the segment 1025 (e.g., straight line 1025c) and the horizontal reference direction 1060 (FIG. 10B). If the starting point coordinates are (Xs, Ys) and the end-point coordinates are (Xe, Ye), then the two feature elements, F1(s, u) and F2(s, u), are determined by:

$$F1(s, u)=(Xe-Xs)/L$$

$$F2(s, u)=(Ye-Ys)/L$$

where L is the length of the segment as L=sqrt[$(Xe-Xs)^2+(Ye-Ys)^2$]. After step 885, step 875 is entered to access the next segment of the current stroke until the last segment, N, is reached. Upon the last segment, N, being processed, step 885 is entered to obtain the next stroke. This process continues until all feature elements for all segments of all strokes have been determined at which time step 890 is entered.

Figure 10C:
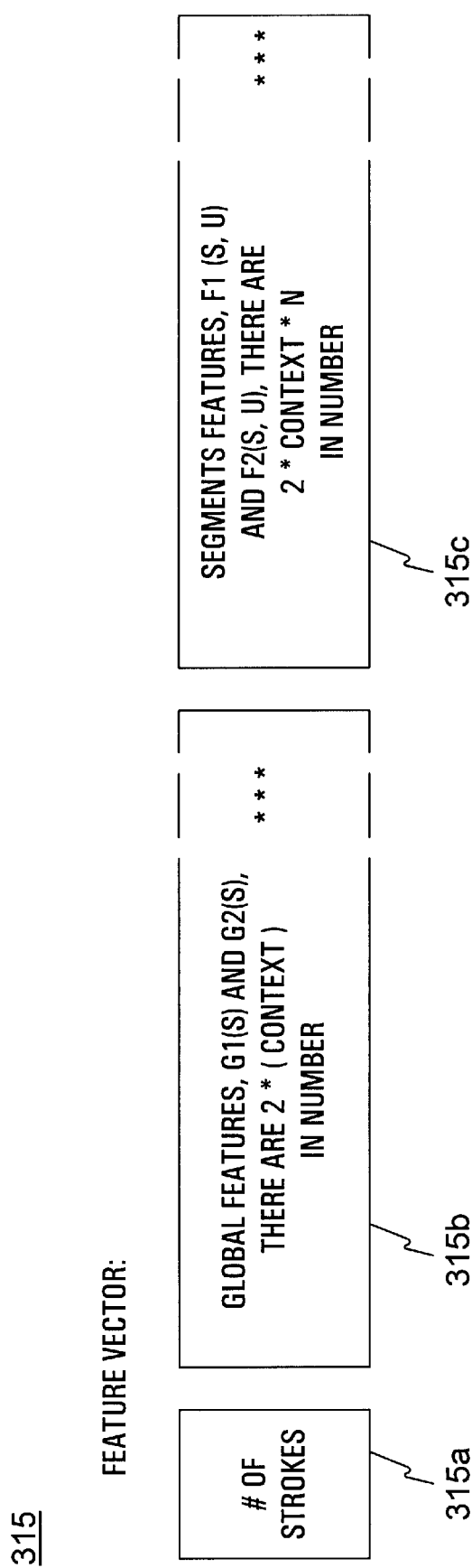
FIG. 10C illustrates the components of a feature vector in accordance with one embodiment of the present invention.

At step 890, a multi-dimensional feature vector associated with the input gesture data is generated and stored in memory 102. The feature vector is used to recognize the input gesture data as one of the preset gesture categories 210 (FIG. 2). FIG. 10C illustrates one exemplary feature vector 315. Feature vector 315 contains a feature element 315a that indicates the number of strokes of the input gesture, as represented by the variable "context." Feature element 315b includes the global features G1(s) and G2(s) computed at step 865 (FIG. 8B) and there are 2*context in number within 315b. Feature element 315c includes the stroke features F1(s, u) and F2(s, u) of each segment of each stroke and there are 2*context*N in number within 315c. The order of the elements of the feature vector 315 is arbitrary, but once determines remains fixed within the present invention.

It is appreciated that at step 890 a number of different recognition processes can be used including storing each predefined feature vector 315 into memory 102 and then comparing the new feature vector against each stored feature vector to uncover a best match. However, FIG. 10C illustrates a preferred method 890 of recognizing the input gesture using the determined feature vector 315 and a radial basis function neural network.

At step 905 of FIG. 8C, the present invention utilizes the multi-dimensional feature vector (FV) 315 to point to a particular space within a multi-dimensional space within a radial basis function neural network 320 (FIG. 3). The multi-dimensional space of the radial basis function network 320 contains multiple bounded areas, each area having a set of multi-dimensional points that all correspond to a respective predefined gesture category (e.g., gesture categories 210a–210z of FIG. 2). By determining to which bounded area the feature vector (FV) 315 points, the present invention recognizes the input gesture 920 to one category. In other words, the present invention at step 890 recognizes the input gesture to be that predetermined gesture category having a bounded area that includes the multi-dimensional point that is pointed to by the feature vector (FV) 315. The identified predetermined gesture category is called the "output gesture category." The present invention utilizes the well known radial basis function network to perform this recognition process. Use of the radial basis function network is described in a work entitled "Introduction to Radial Basis Function Networks" by Mark J. L. Orr, published by the Centre for Cognitive Science, University of Edinburgh, 2, Buccleuch Place, Edinburgh EH8 9LW, Scotland. Automatic gesture training, used with the radial basis function network of the present invention, is further described with respect to FIGS. 11A–11E.

At step 910 of FIG. 8C, the present invention locates the set of computer commands from memory list 220 (FIG. 2) that are associated with the output gesture category. These commands are retrieved from memory unit 102. At optional step 915 the present invention requests user confirmation before applying the set of computer commands associated with the output gesture category. In certain cases, it is desirable to have user confirmation before certain computer commands are applied to the computer system 112. For instance, confirmation is typically requested before performing file erase and file deletions. At step 920, the present invention applies the set of computer commands identified at step 910, and associated with the output gesture category, to the computer system 112. In one implementation, the set of computer commands can be applied to a particular application program with which the user is concurrently involved.

Geture Category Training Process 1200

FIG. 12 illustrates a generalized flow diagram of steps performed by the present invention for training the gesture category recognition process 800 to recognize gesture categories. More generally, gesture training process 1200 is used by the present invention for defining the predetermined gesture categories 210a–210z and their associated sets of computer commands 210a–210z as shown in FIG. 2. It is appreciated that process 1200 is implemented by computer system 112 executing instructions that are stored in a computer readable memory unit (e.g., unit 102). Like process 800, process 1200 can operate in the background. Process 1200 is invoked upon a user selecting a training mode of the present invention.

At step 1210 of FIG. 12, a user indicates whether a new gesture category is being created or if an existing gesture category is being modified. The present invention records the coordinate displacements of the cursor directing device 107 and stores this information, along with the associated timestamps, into a memory 102, as gesture data. Step 1210 can be performed in an analogous fashion as steps 805–835 of FIG. 8A. At step 1220 of FIG. 12, the present invention determines a small spatial window that encompasses the input gesture data, normalizes the window, and computes a feature vector (FV) based on the input gesture data. Step 1220 can be performed in an analogous fashion to steps 840–885 of FIG. 8A and FIG. 8B. At step 1230, if a new gesture category is being defined, the present invention receives from the user a definition of the new gesture category (e.g., including an optional short name) including a set of computer commands that are associated with the new gesture category. This set of commands is stored in memory 102 and is associated with the new gesture category's definition. At step 1230, if an existing gesture category is being modified, the user inputs the name of the existing gesture category and any new computer commands. It is appreciated that step 1230 can also occur before step 1210.

Assuming a new gesture category is being defined, at step 1240 of FIG. 12, the present invention utilizes the feature vector (FV) of the input gesture data to insert a new multi-dimensional bounded area into the multi-dimensional space of the radial basis function network 320 (FIG. 3). The new multi-dimensional bounded area, depending on its location, can cause previously defined multi-dimensional bounded areas to shrink in size. The size of the multi-dimensional bounded area that corresponds to the feature vector computed in step 1220 depends on the number of other previously defined multi-dimensional bounded areas and also depends on the area within the multi-dimensional space to which the feature vector points. After the creation of the new multi-dimensional bounded area within the radial basis function network, the present invention associates the new multi-dimensional bounded area with the new gesture category and also with its new set of computer commands. At this point, the new gesture category is added to the existing list 210 of gesture categories to list 220 (FIG. 2). It is appreciated that the feature vector of the input gesture data is not saved but is rather used to alter the radial basis function neural network.

In gesture category recognition mode, the next time input gesture data decodes into a feature vector that points within the new multi-dimensional bounded area, the input gesture data will be recognized by process 800 as being associated with this new gesture category.

Assuming an existing gesture category is being modified, the input gesture data received at step 1210 can also be a positive example. In this case, the input gesture data is used at step 1240 to increase the size of a previously defined bounded area that is associated with the gesture category being modified. For instance, if a bounded area already exists for gesture category C and the input gesture data was a positive example for gesture category C, then the bounded area for gesture category C would increase at step 1240 to account for the new feature vector.

Assuming an existing gesture category is being modified, the input gesture data received at step 1210 can also be a counter example in which case the input gesture data is used at step 1240 to decrease the size of a previously defined bounded area associated with the gesture category being modified. For instance, if a bounded area already exists for gesture category C and the input gesture data was a counter example for gesture category C, then the bounded area for gesture category C would shrink at step 1240.

Figure 11C:
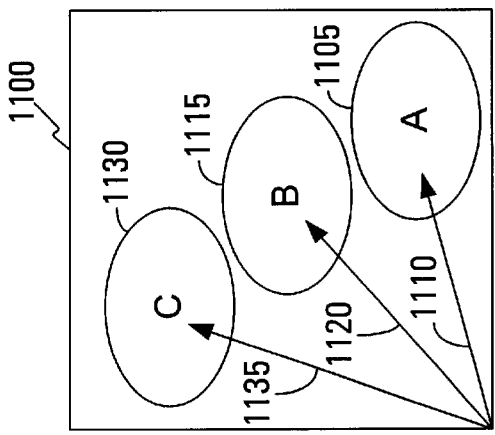
FIGS. 11A, 11B, 11C, 11D and 11E illustrates exemplary steps performed during the training of the computer system of the present invention using a radial basis function neural network for gesture category recognition.
Figure 11E:
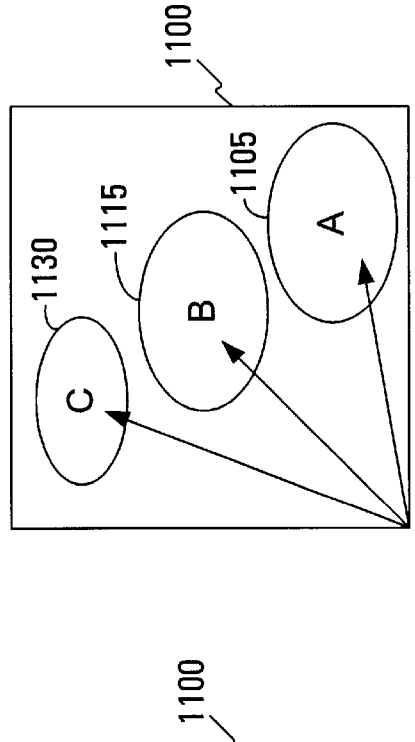
Figure 11B:
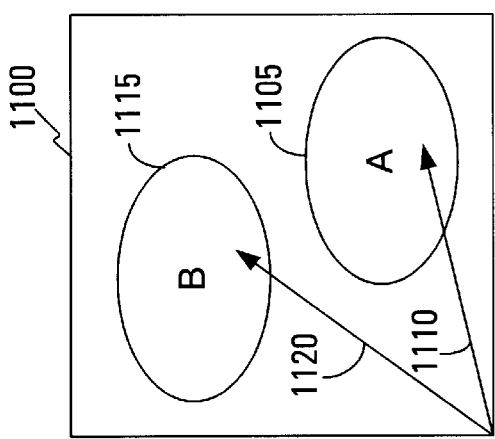
Figure 11D:
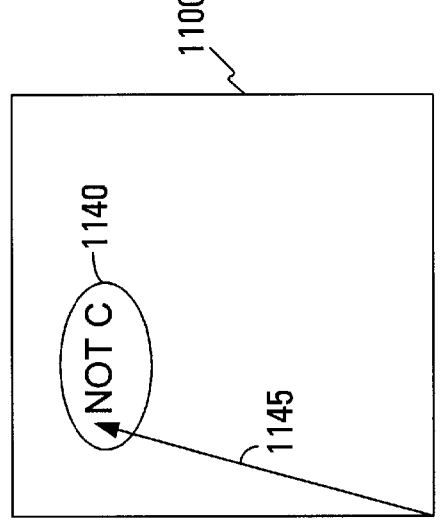
Figure 11A:
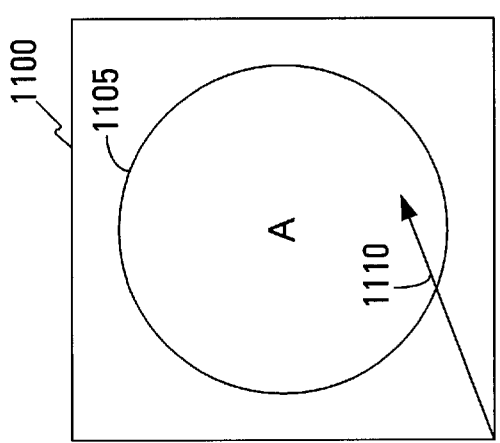

FIGS. 11A–11E illustrate the manner in which step 1240 creates a multi-dimensional bounded area for an exemplary multi-dimensional space having only two dimensions. This corresponds to a feature vector having only two elements (e.g., m=1 and n=1). The concepts described with respect to this example can readily be applied to configurations having three or more dimensions (which are more difficult to represent diagrammatically). When the multi-dimensional space 1100 is empty (e.g., no gestures are defined yet), FIG. 11A illustrates a condition when a first gesture category is defined. The first gesture category (A) has an associated two dimensional feature vector 1110 and a bounded area 1105 is defined to fill as much of the multi-dimensional space 1100 as to not be inconsistent with other previously defined bounded areas. In this case, the entire multi-dimensional space 1100 is filled by bounded area 1105 because this space 1100 was previously empty.

FIG. 11B illustrates the configuration when a second gesture category (B) is defined having an associated feature vector 1120. Associated bounded area 1115 fills multi-dimensional space 1100 causing bounded area 1105 to shrink so that the multi-dimensional space 1100 is shared without causing inconsistent areas. Any input feature vector that points within new bounded area 1115 is recognized as being within gesture category B and any input feature vector that points within bounded area 1105 is recognized as being within gesture category A.

FIG. 11C illustrates the configuration when a third gesture category (C) is defined having an associated feature vector 1135. Associated bounded area 1130 fills multi-dimensional space 1100 causing bounded areas 1105 and 1115 to shrink so that the multi-dimensional space 1100 is shared without causing inconsistent areas. Any input feature vector that points within bounded area 1115 is recognized as being within gesture category B and any input feature vector that points within bounded area 1105 is recognized as being within gesture category A and any input feature vector that points within new bounded area 1130 is recognized as being within gesture category C.

FIGS. 11A–11C represent defining gesture categories through single positive examples. FIG. 11D and FIG. 11E illustrate that a bounded area for a gesture category can also be defined using negative or "counter" examples. In this case, refer to FIG. 11D wherein a feature vector 1145 is submitted to the multi-dimensional space 1100 and is defined to be "not C." The bounded area 1140 is therefore not to be considered as gesture category C. The result of the elements of the multi-dimensional space 1100 is shown in FIG. 11E. In this case, the bounded area 1130 defining gesture category C shrinks and the bounded area 1115 defining gesture category B grows slightly and the bounded area 1105 defining gesture category A remains constant. As before, any input feature vector that points within bounded area 1115 is recognized as being within gesture category B, any input feature vector that points within bounded area 1105 is recognized as being within gesture category A and any input feature vector that points within new bounded area 1130 is recognized as being within gesture category C.

It is appreciated that a bounded area within the multi-dimensional area of the present invention can also be increased in size based on a the user supplying two or more positive example gestures that the user wants to be recognized as being associated with the same predefined gesture category. For instance, the user may have several different ways in which to trace a circle with the cursor directing device. The user can input each different circle gesture into the computer, generate a feature vector for each circle gesture and use all of these feature vectors to generate one large bounded area to represent the circle gesture category or the above can be done to increase the size of an existing bounded area that corresponds to the circle gesture category. This case is similar to the example shown in FIG. 11D and FIG. 11E except assume bounded area 1140 is a positive example of gesture category "C" thereby causing bounded area 1130 to increase in size, rather than decrease in size.

It is appreciated also that within each example of FIG. 11A–FIG. 11E, the feature vectors are used to alter the radial basis function neural network 320 and are not thereafter saved in memory 102.

Figure 13:
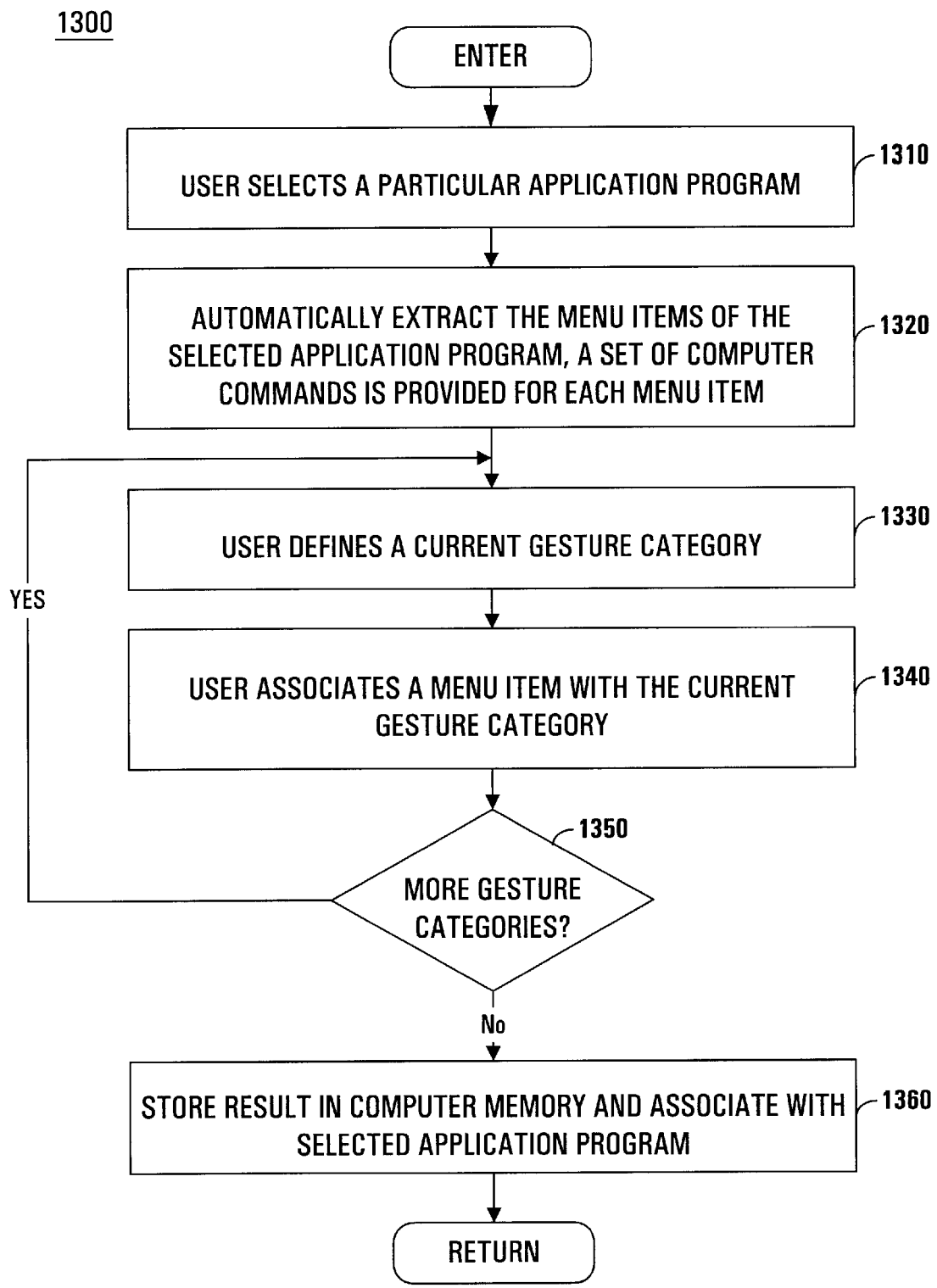
FIG. 13 illustrates a flow chart of steps in accordance with an embodiment of the present invention for gesture category training based on extracted computer commands from menu items of an application program.

Gesture Category Training Process 1300 with Automatic Menu Item Extraction FIG. 13 illustrates a generalized flow diagram of steps performed by the present invention for training the gesture category recognition process 800 to apply a set of computer commands that correspond to menu items of a particular application program. More generally, gesture training process 1300 is used by the present invention for defining the predetermined gesture categories 210a–210z and their associated sets of computer commands 210a–210z, as shown in FIG. 2, where the set of commands relate to menu items of a selected application program. It is appreciated that process 1300 is implemented by computer system 112 executing instructions that are stored in a computer readable memory unit (e.g., unit 102). Process 1300 is invoked upon a user selecting a "menu item" training mode of the present invention.

At step 1310 of FIG. 13, the present invention allows the user to select a particular application program de novo or from a list of previously defined programs. At step 1320, the present invention automatically extracts the menu items of the selected application program and a set of computer commands for each extracted menu item. The set of computer commands associated with a particular menu item are those instructions that are applied to the computer system 112 when that menu item or function of the application is invoked by a user by selection from a menu hierarchy. The extracted sets of commands are stored in list 220 (FIG. 2) and individually indexed. A number of well known menu item extraction processes can be used at step 1320.

By defining a gesture category and associating that gesture category with a particular menu item, the user can invoke all of the required computer commands that are associated with that menu item by merely performing a gesture recognized as being within the gesture category. For instance, assume a word processing document has a menu item for saving the current document. The menu item, "save", can be located and selected using the keyboard 106 or with the mouse device 107 interacting with the menu hierarchy as displayed on the display screen 105. Under the present invention, the same set of commands that are invoked upon selecting the "save" option can be selected by gesturing the mouse device 107 without interacting with the menu hierarchy at all.

At step 1330 of FIG. 13, the present invention allows the user to define a current gesture category. This can be accomplished by process 1200 (FIG. 12) or step 1330 can be accomplished by a user selecting a predefined gesture category within list 210. At step 1340, the present invention allows the user to associate one of the extracted menu items of step 1320 with the current gesture category so that when gesture data is recognized (by process 800) as being within the current gesture category, the associated set of computer commands are then applied to computer system 112. As shown by step 1350, this process is repetitive and is performed for each gesture category the user defines. It is appreciated that a user can associate gesture categories with merely a subset of the menu items that were extracted from step 1320. Step 1360 is described below.

Figure 14:
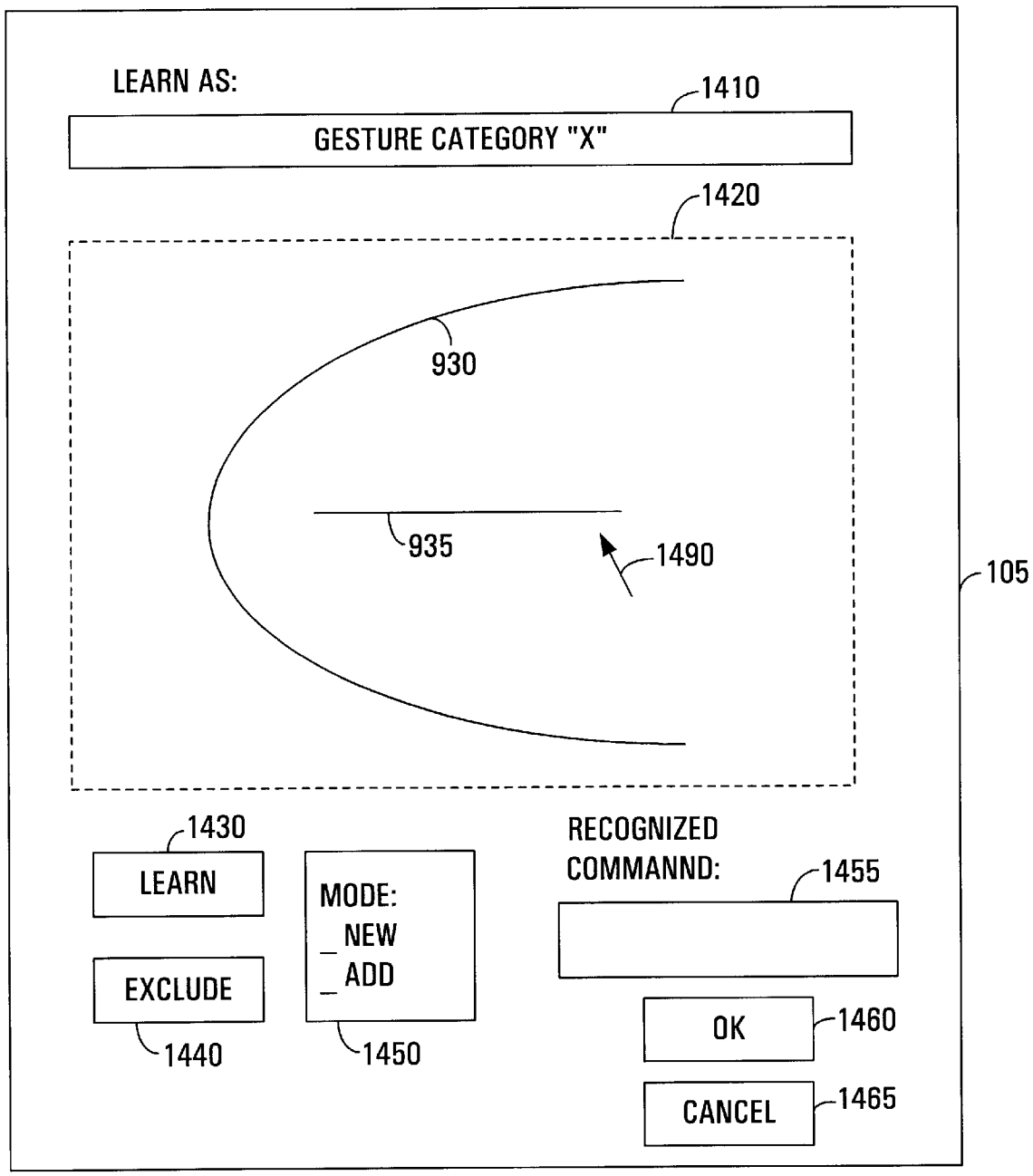
FIG. 14 is an exemplary user interface display for training the gesture category recognition process of the present invention.

FIG. 14 is an exemplary user interface display that can be used to facilitate the training of the gesture category recognition process 1200 of the present invention. The information is displayed on display screen 105. The display includes a window 1420 onto which is displayed a representation of each stroke, e.g., stroke 930 and 935, of a gesture created in real-time by a user. The gesture category to which the gesture is to be associated is typed into window 1410. If in training mode and the user wants the gesture to be added to an existing gesture category, then the name of the existing gesture category is entered into window 1410, the gesture is drawn, the "learn" button 1430 is clicked using cursor 1490 and the "add" option within box 1450 is highlighted. If the gesture is a negative example, then the "exclude" 1440 button is clicked.

If a new category is being defined, then the name of the new gesture category is entered into window 1410, the gesture is drawn, the "learn" button 1430 is clicked using cursor 1490 and the "new" option within box 1450 is highlighted. If the gesture is a negative example, then the "exclude" 1440 button is clicked. At any time just after a gesture is drawn in window 1420 and the recognition process 800 recognizes the gesture as being associated with an existing gesture category, then that gesture category name is displayed in window 1455. Optionally, the command set associated with the gesture category can also be displayed on display screen 105.

Three Dimensional Gesture Data

The present invention is described above with respect to defining gesture categories and receiving gesture data that are defined with respect to two dimensional space, in (x, y) coordinates, using a cursor directing device 107. However, the present invention can be extended to include defining gesture categories and gesture data that utilize three dimensional space (x, y, z). In this case, the cursor directing device is able to track the movement of an object (e.g., a user's finger) through a three dimensional space. An optical tracking device (e.g., a camera or other sensing device) can be used in this embodiment to input three dimensional displacement information (x, y, z) in lieu of two dimensional coordinate information. In other embodiments, multi-dimensional coordinates (e.g., more than three) can also be recorded as gesture data.

Application-Specfic Gesture Categories

At step 1360 of FIG. 13 the present invention allows the user to store the associations of particular sets of computer commands and their gesture categories (as defined steps 1310–1350) in memory 102 and associate this stored information with the selected application program (selected in step 1310). The definitions of process 1300 thereby become application specific. Process 1300 can be performed for a number of different application programs and each application specific dataset is stored in different memory locations. When a selected application program is invoked, the present invention automatically retrieves from memory 102 the appropriate database 210 and 220 that corresponds to the appropriate application program. In this case, the same gesture category can be defined for multiple menu items and can invoke different sets of computer commands depending on the particular application that is actively being used by the user. Therefore, when the user switches from application program to application program, the present invention automatically detects the change and loads the application specific dataset.

User-Specific Gesture Categories

It is appreciated that in the same way that a group of gesture categories and their associated sets of computer commands can be made application-specific, the present invention allows groups of gesture categories and their associated sets of computer commands to be user-specific. In this case, based on a user name or other user indication, computer system 112 can recall a previously stored set of gesture categories and associated sets of computer commands and make this data resident in memory 102. In this instance, a gesture, and its definition, can be user and application specific simultaneously. This allows the present invention to become extremely versatile and custom tailored for a particular user and for particular applications used by the user.

Password Protection User Identification

The present invention can also be used to provide an effective password protection feature. Application programs and other vital data can have their access restricted until a particular predefined gesture is input to the computer system 112 from the user. The gesture can be checked in combination with a previously defined password that is entered using keyboard 106. Gesture identification is advantageous because of the many different styles of writing and types of gestures available. Password protection is particularly advantageous using gestures because gestures of the same shape can be differentiated by stroke speed, stroke direction and starting point variations.

Application with Intelligent Agents

The present invention can be used in conjunction with an intelligent computer software agent allowing the user to command the agent via gestures. Intelligent software agents are special software applications that reduce or eliminate the user's burden of low level control and supervision of "number crunching," "information mining," "information packaging" and "information delivery" functions as well as "event monitoring" and, in some cases, the "decision making" functions as well. These intelligent agents act on behalf of the user as assistants with increasingly human-like interfaces, behaviors and functionalities. Intelligent agents carry out their actions with certain levels of autonomy based on their programmed and learned skills, knowledge bases, goals and models.

One embodiment of the present invention provides a system and method to add to the intelligent computer software agent's skills the ability to learn to recognize user gestures and also to learn from the user what to do when a given previously trained gesture category is recognized. The reasoning component of the intelligent computer software agent can also take into account input from other sources (e.g., speech recognition, keyboard entry) when deciding on the response to the user, and the action to take.

The preferred embodiment of the present invention, a system and method for gesture category recognition within a computer system, is described. While the present invention has been described in particular embodiments, it should be appreciated that the present invention should not be construed as limited by such embodiments, but rather construed according to the below claims.

What is claimed is:

1. In an electronic system having a processor, a memory, unit, an alphanumeric input device and a cursor directing device, a method of providing a user interface comprising the computer implemented steps of:

a) accessing gesture data representing a gesture formed by tracking movement of a cursor moved by a user with said cursor directing device, said gesture data comprising coordinate positions and timing information and having one or more individual strokes;

b) generating a multi-dimensional feature vector based on said gesture data;

c) providing said multi-dimensional feature vector to a radial basis function neural network for recognition, said radial basis function neural network associating said multi-dimensional feature vector with a gesture category from a predefined plurality of gesture categories and supplying said gesture category as an output value; and d) applying a set of predetermined commands to said electronic system, said set of predetermined commands being associated with said gesture category output from said radial basis function neural network.

2. A method as described in claim 1 wherein said step a) comprises the steps of:

a1) referencing received coordinate positions and timing information with a current stroke while a gesture key is pressed and while a button on said cursor directing device is pressed;

a2) referencing received coordinate positions and timing information with a next stroke after said button is released and while said gesture key is pressed and while said button is pressed again; and a3) terminating receiving said gesture data upon said gesture key being released.

3. A method as described in claim 1 wherein said step b) comprises the steps of:

b1) normalizing said gesture data;

b2) dividing each stroke of said gesture data into a plurality of segments, N;

b3) determining first feature elements for each stroke of said gesture data based on an end point of a respective stroke and a start point of a next stroke;

b4) determining second feature elements for each segment of each stroke of said gesture data based on an orientation of each segment with respect to a reference line, wherein said multi-dimensional feature vector comprises: a value indicating the number of strokes within the gesture data; said first feature elements; and said second feature elements.

4. A method as described in claim 3 wherein said value of N is inversely related to the number of strokes of said gesture data.

5. A method as described in claim 3 wherein said step b3) is performed for each stroke of said gesture data and comprises the steps of:

determining a coordinate position of said end point of said current stroke;

determining a coordinate position of said start point of said next stroke; and determining said first feature elements based on the difference in x-coordinate positions and the difference in y-coordinate positions of said end point and said start point.

6. A method as described in claim 3 wherein said step b4) is performed for each segment of each stroke of said gesture data and comprises the steps of:

determining a start point and an end point of a respective stroke segment; and determining said stroke feature elements for said respective stroke segment according to the sine and cosine of the directed angle between a straight line between said start point and said end point of said respective stroke segment and a horizontal reference.

7. A method as described in claim 3 further comprising the step of e) adding a new gesture category to said radial basis function neural network by performing the steps of:

e1) receiving a new gesture category name;

e2) receiving first gesture data;

e3) generating a first multi-dimensional feature vector based on said first gesture data;

e4) creating a bounded area within a predefined space associated with said radial basis function neural network according to said first multi-dimensional feature vector; and e5) associating said bounded area with said new gesture category within said predefined plurality of gesture categories and associating a function to be performed with said new gesture category.

8. A method as described in claim 7 further comprising the step of f) modifying an existing gesture category of said radial basis function neural network by performing the steps of:

f1) receiving an existing gesture category name;

f2) receiving second gesture data;

f3) generating a second multi-dimensional feature vector based on said second gesture data; and f4) modifying a pre-existing bounded area within said predefined space associated with said radial basis function neural network that is associated with said existing gesture category according to said second multi-dimensional feature vector.

9. A method as described in claim 8 wherein said second gesture data corresponds to a positive gesture example.

10. A method as described in claim 8 wherein said second gesture data corresponds to a negative gesture example.

11. A method as described in claim 1 further comprising the steps of:

e) generating a first portion of said predefined plurality of gesture categories by automatically extracting menu items from a selected first application and storing said first portion into said memory unit upon said user invoking said first application; and f) generating a second portion of said predefined plurality of gesture categories by automatically extracting menu items from a selected second application and storing said second portion into said memory unit upon said user invoking said second application.

12. In an electronic system having a processor, a memory unit, an alphanumeric input device and a cursor directing device, a method of determining a feature vector representing a gesture comprising the computer implemented steps of:

a) accessing gesture data representing a gesture formed by tracking movement of a cursor moved by a user with said cursor directing device, said gesture data comprising coordinate positions and timing information and having one or more individual strokes;

b) normalizing said gesture data;

c) dividing each stroke of said gesture data into a plurality of segments, N;

d) determining first feature elements for a respective stroke of said gesture data based on an end point of said respective stroke and a start point of a next stroke, wherein step d) is performed for each stroke of said gesture data; and e) determining second feature elements for each segment of each stroke of said gesture data based on an orientation of each segment with respect to a reference line, wherein said feature vector comprises: a value indicating the number of strokes of said gesture data; said first feature elements for each stroke; and said second feature elements for each segment of each stroke.

13. A method as described in claim 12 wherein said value of N is inversely related to the number of strokes of said gesture data.

14. A method as described in claim 12 wherein said step d) comprises the step determining said first feature elements for said respective stroke based on the difference in x-coordinate positions and the difference in y-coordinate positions of said start point and said end point.

15. A method as described in claim 12 wherein said step e) comprises the steps of:

e1) determining a start point and an end point of a respective stroke segment;

e2) determining said stroke feature elements for said respective stroke segment according to the sine and cosine of the directed angle between a straight line between said start point and said end point of said respective stroke segment and a horizontal reference; and e3) performing steps e1) and e2) for each segment of each stroke of said gesture data.

16. In an electronic system having a processor, a memory unit, an alphanumeric input device and a cursor directing device, a method of training said system to recognize gestures comprising the computer implemented steps of:

a) defining a new gesture category name;

b) accessing gesture data representing a gesture formed by tracking movement of a cursor moved by a user with said cursor directing device, said gesture data comprising coordinate positions and timing information and having one or more individual strokes;

c) generating a feature vector based on said gesture data;

d) using said feature vector to generate a bounded area within a predefined space associated with a radial basis function neural network;

e) associating said bounded area with said new gesture category name within a predefined plurality of gesture categories stored in said memory unit; and f) associating a set of predetermined commands to said new gesture category name, said set of predetermined commands for application to said electronic system upon said new gesture category name being recognized by said radial basis function neural network.

17. A method as described in claim 16 wherein said step c) comprises the steps of:

c1) normalizing said gesture data;

c2) dividing each stroke of said gesture data into a plurality of segments, N;

c3) determining first feature elements for a respective stroke of said gesture data based on an end point of said respective stroke and a start point of a next stroke, said step c3) performed for each stroke of said gesture data; and c4) determining second feature elements for each segment of each stroke of said gesture data based on an orientation of each segment with respect to a reference line, wherein said feature vector comprises: a value indicating the number of strokes of said gesture data; said first feature elements for each stroke; and said second feature elements for each segment of each stroke.

18. A method as described in claim 17 wherein said step c4) is performed for each segment of each stroke and comprises the steps of:

determining a start point and an end point of a respective stroke segment; and determining said stroke feature elements for said respective stroke segment according to the sine and cosine of the directed angle between a straight line between said start point and said end point of said respective stroke segment and a horizontal reference.

19. A method as described in claim 17 wherein said value of N is inversely related to the number of strokes of said gesture data.

20. A method as described in claim 17 wherein said step c3) comprises the step of determining said first feature elements based on the difference in x-coordinate positions and the difference in y-coordinate positions of said start point and said end point.

21. In an electronic system having a processor, a memory unit, an alphanumeric input device and a cursor directing device, a method of training said system to recognize gestures comprising the computer implemented steps of:

a) identifying an existing gesture category name within a predefined set of gesture categories stored within said memory unit;

b) accessing gesture data representing a gesture formed by tracking movement of a cursor moved by a user with said cursor directing device, said gesture data comprising coordinate positions and timing information and having one or more individual strokes;

c) generating a feature vector based on said gesture data; and d) using said feature vector to modify a pre-existing bounded area within a predefined space associated with a radial basis function neural network, said pre-existing bounded area being associated with said existing gesture category.

22. A method as described in claim 21 wherein said step c) comprises the steps of:

c1) normalizing said gesture data;

c2) dividing each stroke of said gesture data into a plurality of segments, N;

c3) determining first feature elements for a respective stroke of said gesture data based on an end point of said respective stroke and a start point of a next stroke, said step d) performed for each stroke of said gesture data; and c4) determining second feature elements for each segment of each stroke of said gesture data based on an orientation of each segment with respect to a reference line, wherein said feature vector comprises: a value indicating the number of strokes of said gesture data; said first feature elements for each stroke; and said second feature elements for each segment of each stroke.

23. A method as described in claim 22 wherein said gesture data represents a positive gesture example which increases the size of said pre-existing bounded area within said predefined space associated with said radial basis function neural network.

24. A method as described in claim 22 wherein said gesture data represents a negative gesture example which decreases the size of said pre-existing bounded area within said predefined space associated with said radial basis function neural network.

25. An electronic system comprising:

a processor coupled to a bus;

an alphanumeric input device and a cursor directing device coupled to said bus; and a memory unit coupled to said bus, said memory unit containing instructions that when executed implement a method of providing a user interface comprising the steps of:

a) accessing gesture data representing a gesture formed by tracking movement of a cursor moved by a user with said cursor directing device, said gesture data comprising coordinate positions and timing information and having one or more individual strokes;

b) generating a multi-dimensional feature vector based on said gesture data;

c) providing said multi-dimensional feature vector to a radial basis function neural network for recognition, said radial basis function neural network associating said multi-dimensional feature vector with a gesture category from a predefined plurality of gesture categories and supplying said gesture category as an output value; and d) applying a set of predetermined commands to said electronic system, said set of predetermined commands being associated with said gesture category output from said radial basis function neural network.

26. An electronic system as described in claim 25 wherein said step b) of said method comprises the steps of:

b1) normalizing said gesture data;

b2) dividing each stroke of said gesture data into a plurality of segments, N;

b3) determining first feature elements for each stroke of said gesture data based on an end point of a respective stroke and a start point of a next stroke;

b4) determining second feature elements for each segment of each stroke of said gesture data based on an orientation of each segment with respect to a reference line, wherein said multi-dimensional feature vector comprises: a value indicating the number of strokes within the gesture data; said first feature elements; and said second feature elements.

* * * * *